US009128606B2

(12) United States Patent
Won et al.

(10) Patent No.: US 9,128,606 B2
(45) Date of Patent: Sep. 8, 2015

(54) MOBILE TERMINAL AND SCREEN PARTITIONING METHOD THEREOF

(75) Inventors: Yoonchan Won, Seoul (KR); Heekyung Woo, Seoul (KR); Youngwoo Kim, Seoul (KR); Byoungzoo Jeong, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 163 days.

(21) Appl. No.: 13/406,294

(22) Filed: Feb. 27, 2012

(65) Prior Publication Data

US 2012/0327106 A1 Dec. 27, 2012

(30) Foreign Application Priority Data

Jun. 27, 2011 (KR) ........................ 10-2011-0062106

(51) Int. Cl.
G09G 5/00 (2006.01)
G06F 3/0488 (2013.01)
G09G 5/14 (2006.01)

(52) U.S. Cl.
CPC ........ *G06F 3/04883* (2013.01); *G06F 3/04886* (2013.01); *G06F 3/0488* (2013.01); *G06T 2219/024* (2013.01); *G09G 5/14* (2013.01); *G09G 2340/0492* (2013.01)

(58) Field of Classification Search
CPC .............. G06T 2219/024; G06F 3/048; G06F 3/03547; G06F 3/0486; G06F 3/0488; G06F 3/04886; G09G 5/14; G09G 2340/0492
See application file for complete search history.

(56) References Cited

U.S. PATENT DOCUMENTS

| 2008/0005235 | A1* | 1/2008 | Hegde et al. ................... 709/204 |
| 2009/0296331 | A1* | 12/2009 | Choy ........................ 361/679.09 |
| 2009/0322690 | A1 | 12/2009 | Hiltunen et al. |
| 2009/0325686 | A1* | 12/2009 | Davis et al. ..................... 463/25 |
| 2010/0093399 | A1* | 4/2010 | Kim et al. ..................... 455/566 |
| 2010/0205190 | A1 | 8/2010 | Morris et al. |
| 2010/0293501 | A1 | 11/2010 | Russ et al. |
| 2011/0107272 | A1* | 5/2011 | Aguilar ......................... 715/853 |
| 2012/0176322 | A1* | 7/2012 | Karmi et al. ................... 345/173 |

FOREIGN PATENT DOCUMENTS

| EP | 1 837 748 A1 | 9/2007 |
| EP | 2 177 983 A2 | 4/2010 |
| WO | WO 2008/030563 A2 | 3/2008 |
| WO | WO 2009/037588 A2 | 3/2009 |
| WO | WO 2009-061952 A1 | 5/2009 |

OTHER PUBLICATIONS

"Cisco WebEx Meeting Ceneter User Guide", http://www.cisco.com/c/dam/en/us/td/docs/collaboration/meeting_center/wx_mc_host_ug.pdf; Jul. 28, 2009, p. 1, 11-12.*

* cited by examiner

*Primary Examiner* — Michelle L Sams
(74) *Attorney, Agent, or Firm* — Birch, Stewart, Kolasch & Birch, LLP

(57) ABSTRACT

A mobile terminal and controlling method thereof are disclosed, by which various and convenient functions are provided through screen partition in consideration of a plurality of users. The present invention includes a touchscreen recognizing a touch input and a controller setting a reference line on the touchscreen to correspond to a $1^{st}$ pattern touch input, the controller partitioning the touchscreen into a $1^{st}$ region and a $2^{nd}$ region in accordance with the set reference line, the controller controlling an image displayed on the $1^{st}$ region to be displayed on the $2^{nd}$ region in a manner of being reversed.

14 Claims, 16 Drawing Sheets

MOBILE TERMINAL AND SCREEN PARTITIONING METHOD THEREOF

Pursuant to 35 U.S.C. §119(a), this application claims the benefit of earlier filing date and right of priority to Korean Patent Application No. 10-2011-0062106, filed on Jun. 27, 2011, the contents of which are hereby incorporated by reference herein in their entirety.

BACKGROUND OF THE INVENTION

1. Field of the Invention

The present invention relates to a mobile terminal, and more particularly, to a mobile terminal and controlling method thereof. Although the present invention is suitable for a wide scope of applications, it is particularly suitable for providing various and convenient functions through screen partition in consideration of a plurality of users.

2. Discussion of the Related Art

Generally, terminals can be classified into mobile/portable terminals and stationary terminals. The mobile terminals can be classified into handheld terminals and vehicle mount terminals again according to possibility of user's direct portability.

As functions of the terminal are diversified, the terminal is implemented as a multimedia player provided with composite functions such as photographing of photos or videos, playback of music or video files, game play, broadcast reception and the like for example.

To support and increase the terminal functions, it may be able to consider the improvement of structural parts and/or software parts of the terminal.

Recently, the ongoing spread and performance enhancement of such a mobile terminal as a smart phone enables a user to utilize the mobile terminal in various ways. For example of the needs attributed to the mobile terminal, the demand for methods of sharing a terminal with a plurality of users conveniently is rising.

SUMMARY OF THE INVENTION

Accordingly, the present invention is directed to a mobile terminal and controlling method thereof that substantially obviate one or more problems due to limitations and disadvantages of the related art.

An object of the present invention is to provide a mobile terminal and controlling method thereof, by which a plurality of users may be able to use the mobile terminal more conveniently.

Another object of the present invention is to provide a mobile terminal and controlling method thereof, by which various and convenient functions may be provided through screen partition in consideration of a plurality of users.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings. The object is solved by a mobile terminal comprising: a touchscreen configured to receive a touch input; and a controller configured to set a reference indicator on the touchscreen based on a first user input, partition the touchscreen into a 1st region and a 2nd region in accordance with the set reference indicator, and control an image displayed on the 1st region to be displayed on the 2nd region in a manner of being reversed.

Preferably, the reversion includes at least one of a 180-degree rotation, side-to-side symmetry and top-to-bottom symmetry. That means the image is displayed in the 2nd region in a way to allow a second person sitting opposite to a first person to recognize the image.

Preferably, the reference indicator may be realized as a reference line. The reference indicator may be also realized as an icon or arrow, preferably at the edge of touchscreen. The reference indicator may also comprise two or more indicators to visualize the partition to the users of the touchscreen.

Preferably, the first user input may be a 1st pattern touch input. However, the partition of the touchscreen could also be initiated by pressing a button or key outside the touchscreen or a soft button displayed on the touchscreen.

Preferably, the 1st pattern touch input may comprise a touch & drag input inputted from a first predetermined position on the touchscreen to a second predetermined position. The controller may set the reference line along a trace of the touch & drag input or one or more reference indicators at predetermined positions of the trace, e.g. at the edge of the touchscreen or as a dashed line. In a further preferred embodiment the reference indicators are placed opposing to each other, whereas a bar is placed between them. By touch the bar or both reference indicators it is possible to shift the bar and thereby the partition of the touchscreen. Thus it is possible to also achieve a asymmetric apportionment of the touchscreen, may be providing the second opposing party only a reading possibility and to have the largest part of the touchscreen for the first party who is making amendments on the content displayed by the touchscreen.

Preferably, the first predetermined position is located near one edge of the touchscreen, wherein the second predetermined position is located near to the other edge, preferably the opposing edge. But the first and second positions could also be located at any position on the touchscreen. Thus, by making a touch & drag input between any positions, it is possible to partition the touchscreen.

Preferably, the partition is actuated only if a contact size of touch & drag input is equal to or greater than a preset value. Only if the length of the touch & drag input is equal or greater than a certain threshold, the controller is adapted to control the reference line or indicator to be set.

Preferably, when the touch & drag input starts, the controller may be adapted to provide a dimming effect to the touchscreen and/or provide a prescribed visual effect along the trace of the touch & drag input. If the touch & drag input is ended, the controller may be adapted to display the reference indicator and control the dimming effect to disappear. may be Preferably, if a second user input is recognized, the controller may determine whether to recognize a touch input via the 1st or 2nd region. Thus, by recognizing a second user input being different than the first user input, e.g. a multiple touch or predefined other input, it is possible to deactivate the recognition of a touch input in a certain area of the touchscreen. Thus, by inputting a second user input for the 1st region, no touch input is allowed in the 2nd region and vice versa. Preferably, the second user input is a 2nd pattern touch input on the touchscreen. The controller may determine whether to recognize a touch input via the 1st or 2nd region in accordance with a point at which the 2nd pattern touch input is recognized.

Preferably, the controller may display a 1st icon associated to the 1st region and a 2nd icon associated to the 2nd region on the touchscreen. The controller may control the touch input to be recognized via the region corresponding to either the 1st icon or the 2nd icon selected via the touch input only. Thus, by touching the first icon, the recognition for the region associated to the first icon is activated, wherein the recognition for the region associated to the second icon is deactivated. But, it is also possible to activate or touch both icon, to thereby activate the recognition in both regions.

Preferably, when an image displayed on the 1st region is changed by a user, the controller may control an image displayed on the 2nd region to be changed correspondingly. Thus, the image on the 2nd region is only changed correspondingly, when the 1st icon is selected.

Alternatively, when an image displayed on one of the region is changed, the controller may control the changed image to be applied to both of the regions of the touchscreen.

Preferably, when both of the 1st icon and the 2nd icon are selected together and if an image displayed on a corresponding region is changed in accordance with the touch input via one of the two regions, the controller may control the changed image to be applied to both of the regions.

Preferably, if the touch input of a 3rd pattern is recognized by being applied to one of the two icons, the controller may display a popup window including a list of recognizable commands on the touchscreen. If at least one recognizable command is selected from the popup window, the controller may recognize the selected command only via the region corresponding to the icon on which the 3rd pattern touch was input.

Preferably, if the second user input is inputted, the controller may display a 3rd icon on the touchscreen and the controller recognizes a touch input only in the region, at which the 3rd icon is situated.

Preferably, the controller may control a position of the 3rd icon to be changed in accordance with a flicking touch or a touch & drag input applied to the 3rd icon.

Preferably, the mobile terminal may further comprise a orientation sensor. Thus, the controller may partition the touchscreen into a 1st region and a 2nd region only, if the orientation sensor provides a horizontal alignment signal. Thus, no partition of the touchscreen is activated or allowed, if the mobile terminal is held upright or vertically.

Preferably, when one of the two icons is selected the authority of control is changed by toggling each time the touch input is applied to the corresponding icon.

The object is also solved by a method of controlling a mobile terminal, the method comprising: recognizing a first user input; setting a reference indicator on a touchscreen based on the first user input; partitioning the touchscreen into a 1st region and a 2nd region in accordance with the set reference indicator; and controlling an image displayed on the 1st region to be displayed on the 2nd region in a manner of being reversed.

Preferably, the method further comprises recognizing a touch input of a 2nd pattern via the touchscreen; determining whether to recognize the touch input via the 1st or 2nd region in accordance with a point at which the touch input of the 2nd pattern is recognized; and recognizing the touch input selectively in accordance with a result of the determination.

Accordingly, the present invention provides the following effects and/or advantages.

First of all, a plurality of users may be able to use the mobile terminal through screen partition more conveniently.

Secondly, the authority to control a partitioned screen may be set in various ways. And, a result of writing/amendment of content through sharing may be optionally saved.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

In the following detailed description, reference is made to the accompanying drawing figures which form a part hereof, and which show by way of illustration specific embodiments of the invention. It is to be understood by those of ordinary skill in this technological field that other embodiments may be utilized, and structural, electrical, as well as procedural changes may be made without departing from the scope of the present invention. Wherever possible, the same reference numbers will be used throughout the drawings to refer to the same or similar parts.

As used herein, the suffixes 'module', 'unit' and 'part' are often used for elements in order to facilitate discussion of the disclosure. Therefore, significant meanings or roles are not given to the suffixes themselves and it is understood that the 'module', 'unit' and 'part' can be used together or interchangeably.

Various types of terminals may be implemented using the various techniques discussed herein. Examples of such terminals include mobile as well as stationary terminals, such as mobile phones, user equipment, smart phones, DTV, computers, digital broadcast terminals, personal digital assistants, portable multimedia players (PMPs), navigators, and the like. By way of non-limiting example only, further description will be with regard to a mobile terminal 100, and such teachings may apply equally to other types of terminals.

Figure 1:
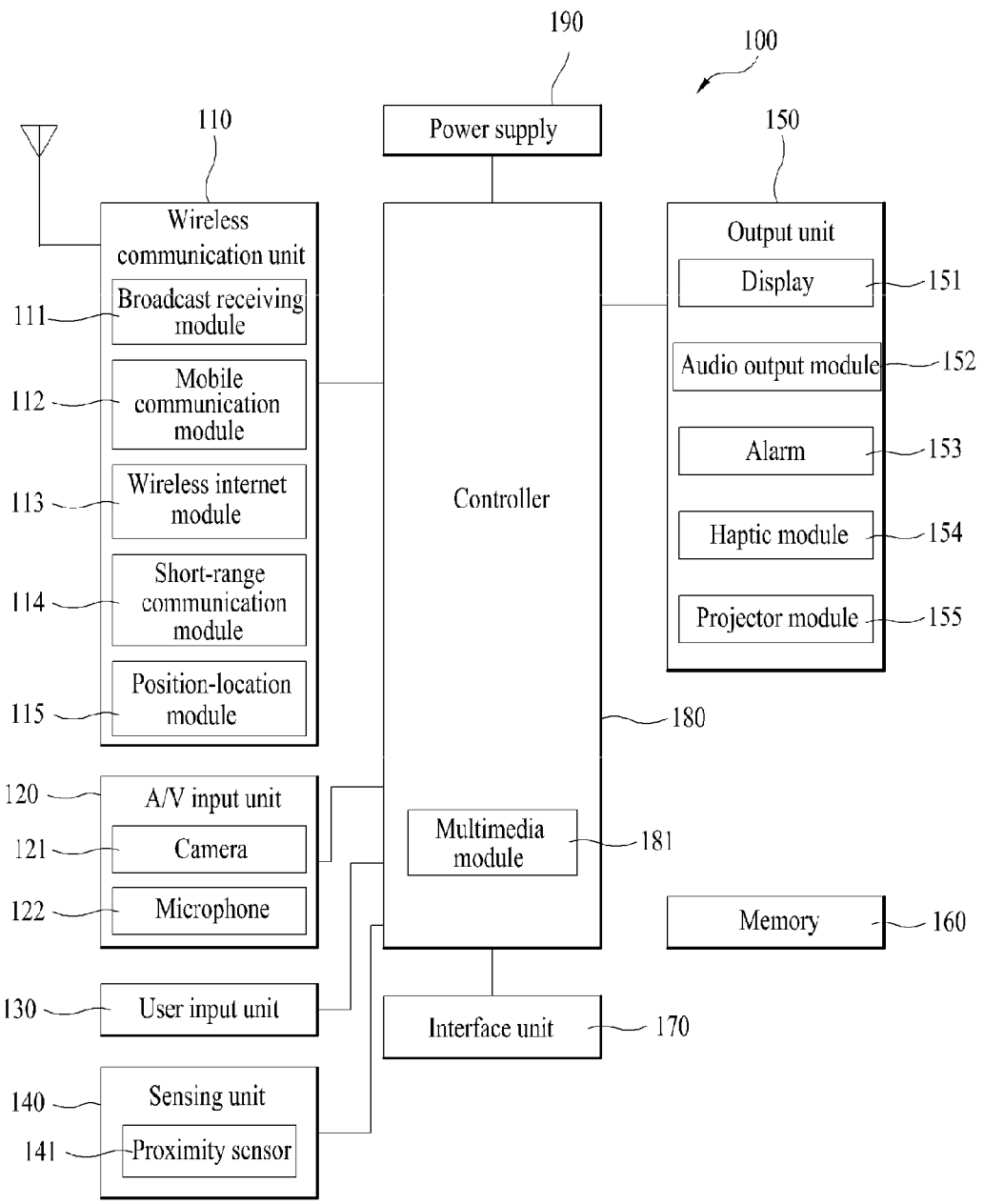
FIG. 1 is a block diagram of a mobile terminal according to one embodiment of the present invention.

FIG. 1 is a block diagram of a mobile terminal 100 in accordance with an embodiment of the present invention. FIG. 1 shows the mobile terminal 100 having a wireless communication unit 110, an A/V (audio/video) input unit 120, a user input unit 130, a sensing unit 140, an output unit 150, a memory 160, an interface unit 170, a controller 180, a power supply unit 190, among other components. Mobile terminal 100 is shown having various components, but it is understood that implementing all of the illustrated components is not a requirement as greater or fewer components may alternatively be implemented.

First of all, the wireless communication unit 110 typically includes one or more components which permits wireless communication between the mobile terminal 100 and a wireless communication system or network within which the mobile terminal 100 is located. For instance, the wireless communication unit 110 can include a broadcast receiving module 111, a mobile communication module 112, a wireless internet module 113, a short-range communication module 114, a position-location module 115, and the like.

The broadcast receiving module 111 receives a broadcast signal and/or broadcast associated information from an external broadcast managing server via a broadcast channel. The broadcast channel may include a satellite channel and a terrestrial channel. The broadcast managing server generally refers to a server which generates and transmits a broadcast signal and/or broadcast associated information or a server which is provided with a previously generated broadcast signal and/or broadcast associated information and then transmits the provided signal or information to a terminal. The broadcast signal may be implemented as a TV broadcast signal, a radio broadcast signal, and a data broadcast signal, among others. If desired, the broadcast signal may further include a broadcast signal combined with a TV or radio broadcast signal.

The broadcast associated information includes information associated with a broadcast channel, a broadcast program, a broadcast service provider, etc. This broadcast associated information can also be provided via a mobile communication network. In this case, the broadcast associated information can be received by the mobile communication module 112.

The broadcast associated information can be implemented in various forms. For instance, broadcast associated information may include an electronic program guide (EPG) of digital multimedia broadcasting (DMB) and electronic service guide (ESG) of digital video broadcast-handheld (DVB-H).

The broadcast receiving module 111 may be configured to receive broadcast signals transmitted from various types of broadcast systems. By nonlimiting example, such broadcasting systems include digital multimedia broadcasting-terrestrial (DMB-T), digital multimedia broadcasting-satellite (DMB-S), digital video broadcast-handheld (DVB-H), the data broadcasting system known as media forward link only (MediaFLO®) and integrated services digital broadcast-terrestrial (ISDB-T). Optionally, the broadcast receiving module 111 can be configured to be suitable for other broadcasting systems as well as the above-identified digital broadcasting systems.

The broadcast signal and/or broadcast associated information received by the broadcast receiving module 111 may be stored in a suitable device, such as a memory 160.

The mobile communication module 112 transmits/receives wireless signals to/from one or more network entities (e.g., base station, external terminal, server, etc.). Such wireless signals may represent audio, video, and data according to text/multimedia message transceiving, among others.

The wireless internet module 113 supports Internet access for the mobile terminal 100. This module may be internally or externally coupled to the mobile terminal 100. In this case, the wireless Internet technology can include WLAN (Wireless LAN) (Wi-Fi), Wibro (Wireless broadband), Wimax (World Interoperability for Microwave Access), HSDPA (High Speed Downlink Packet Access), and the like.

The short-range communication module 114 facilitates relatively short-range communications. Suitable technologies for implementing this module include radio frequency identification (RFID), infrared data association (IrDA), ultra-wideband (UWB), as well at the networking technologies commonly referred to as Bluetooth and ZigBee, to name a few.

The position-location module 115 identifies or otherwise obtains the location of the mobile terminal 100. If desired, this module may be implemented with a global positioning system (GPS) module.

Furthermore, the mobile terminal 100 may include an orientation sensor or any other suited sensor for providing information with respect to the orientation of the mobile terminal. Thus, by having this information the partition of the touch-screen is only made if the mobile terminal has a horizontal orientation, e.g. placed on a table or something like that.

Referring still to FIG. 1, the audio/video (A/V) input unit 120 is shown configured to provide audio or video signal input to the mobile terminal 100. As shown, the A/V input unit 120 includes a camera 121 and a microphone 122. The camera 121 receives and processes image frames of still pictures or video, which are obtained by an image sensor in a video call mode or a photographing mode. Typically, the processed image frames can be displayed on the display 151.

The image frames processed by the camera 121 can be stored in the memory 160 or can be externally transmitted via the wireless communication unit 110. Optionally, two or more cameras 121 can be provided to the mobile terminal 100 according to the environment in which the terminal used to according to user needs.

The microphone 122 receives an external audio signal while the portable device is in a particular mode, such as phone call mode, recording mode and voice recognition mode. This audio signal is processed and converted into electric audio data. The processed audio data is transformed into a format transmittable to a mobile communication base station via the mobile communication module 112 in case of a call mode. The microphone 122 typically includes assorted noise removing algorithms to remove noise generated in the course of receiving the external audio signal.

The user input unit 130 generates input data responsive to user manipulation of an associated input device or devices. Examples of such devices include a keypad, a dome switch, a touchpad (e.g., static pressure/capacitance), a jog wheel, a jog switch, and the like.

The sensing unit 140 provides sensing signals for controlling operations of the mobile terminal 100 using status measurements of various aspects of the mobile terminal. For instance, the sensing unit 140 may detect an open/close status of the mobile terminal 100, relative positioning of components (e.g., a display and keypad) of the mobile terminal 100, a change of position of the mobile terminal 100 or a component of the mobile terminal 100, a presence or absence of user contact with the mobile terminal 100, orientation or acceleration/deceleration of the mobile terminal 100.

As an example, consider the mobile terminal 100 being configured as a slide-type mobile terminal. In this configuration, the sensing unit 140 may sense whether a sliding portion of the mobile terminal is open or closed. Other examples include the sensing unit 140 sensing the presence or absence of power provided by the power supply 190, the presence or absence of a coupling or other connection between the interface unit 170 and an external device. If desired, the sensing unit 140 can include a proximity sensor 141.

The output unit 150 generates outputs relevant to the senses of sight, hearing, touch and the like. In some cases, the output unit 150 includes the display 151, an audio output module 152, an alarm unit 153, a haptic module 154, a projector module 155, and the like.

The display 151 is typically implemented to visually display (output) information associated with the mobile terminal 100. For instance, if the mobile terminal is operating in a phone call mode, the display will generally provide a user interface (UI) or graphical user interface (GUI) which includes information associated with placing, conducting, and terminating a phone call. As another example, if the mobile terminal 100 is in a video call mode or a photographing mode, the display 151 may additionally or alternatively display images which are associated with these modes, the UI or the GUI.

The display module 151 may be implemented using known display technologies including, for example, a liquid crystal display (LCD), a thin film transistor-liquid crystal display (TFT-LCD), an organic light-emitting diode display (OLED), a flexible display and a three-dimensional display. The mobile terminal 100 may include one or more of such displays.

Some of the above displays can be implemented in a transparent or optical transmissive type, which can be named a transparent display. As a representative example for the transparent display, there is TOLED (transparent OLED) or the like. A rear configuration of the display 151 can be implemented in the optical transmissive type as well. In this configuration, a user is able to see an object in rear of a terminal body via the area occupied by the display 151 of the terminal body.

At least two displays 151 can be provided to the mobile terminal 100 in accordance with the implemented configuration of the mobile terminal 100. For instance, a plurality of displays can be arranged on a single face of the mobile terminal 100 in a manner of being spaced apart from each other or being built in one body. Alternatively, a plurality of displays can be arranged on different faces of the mobile terminal 100.

In the case where the display 151 and a sensor for detecting a touch action (hereinafter also referred to a 'touch sensor') configures a mutual layer structure (hereinafter also referred to a 'touchscreen'), the user can use the display 151 as an input device as well as an output device. In this case, the touch sensor can be configured as a touch film, a touch sheet, a touchpad or the like.

The touch sensor can be configured to convert a pressure applied to a specific portion of the display 151 or a variation of a capacitance generated from a specific portion of the display 151 to an electric input signal. Moreover, it is able to configure the touch sensor to detect a pressure of a touch as well as a touched position or size.

If a touch input is made to the touch sensor, signal(s) corresponding to the touch is transferred to a touch controller. The touch controller processes the signal(s) and then transfers the processed signal(s) to the controller 180. Therefore, the controller 180 is able to know whether a prescribed portion of the display 151 is touched.

With continued reference to FIG. 1, a proximity sensor (not shown in the drawing) can be provided to an internal area of the mobile terminal 100 enclosed by the touchscreen or proximate to the touchscreen. The proximity sensor is the sensor that detects a presence or non-presence of an object approaching a prescribed detecting surface or an object existing around the proximity sensor using an electromagnetic field strength or infrared ray without mechanical contact. Hence, the proximity sensor has durability longer than that of a contact type sensor and also has utility wider than that of the contact type sensor.

The proximity sensor can include one or more of a transmissive photoelectric sensor, a direct reflective photoelectric sensor, a mirror reflective photoelectric sensor, a radio frequency oscillation proximity sensor, an electrostatic capacity proximity sensor, a magnetic proximity sensor, an infrared proximity sensor, and the like. When the touchscreen includes the electrostatic capacity proximity sensor, it may also be configured to detect the proximity of a pointer using a variation of electric field according to the proximity of the pointer. In this scenario, the touchscreen (touch sensor) can be classified as a proximity sensor.

In the following description, for clarity, an action that a pointer approaches without contacting with the touchscreen to be recognized as located on the touchscreen is referred to as 'proximity touch' while an action that a pointer actually touches the touchscreen may be referred to as a 'contact touch'. The meaning of the position on the touchscreen proximity-touched by the pointer refers to the position of the pointer which vertically opposes the touchscreen when the pointer performs the proximity touch.

The proximity sensor detects a proximity touch and a proximity touch pattern (e.g., a proximity touch distance, a proximity touch duration, a proximity touch position, a proximity touch shift state, etc.). In addition, information corresponding to the detected proximity touch action and the detected proximity touch pattern can be outputted to the touchscreen.

The audio output module 152 functions in various modes including a call-receiving mode, a call-placing mode, a recording mode, a voice recognition mode, a broadcast reception mode and the like to output audio data which is received from the wireless communication unit 110 or is stored in the memory 160. During operation, the audio output module 152 outputs audio relating to a particular function (e.g., call received, message received, etc.). The audio output module 152 is often implemented using one or more speakers, buzzers, other audio producing devices, and combinations thereof.

The alarm unit 153 may output a signal for announcing the occurrence of a particular event associated with the mobile terminal 100. Typical events include a call received event, a message received event and a touch input received event. The alarm unit 153 is able to output a signal for announcing the event occurrence by way of vibration as well as video or audio signal. The video or audio signal can be outputted via the display 151 or the audio output unit 152. Hence, the display 151 or the audio output module 152 can be regarded as a part of the alarm unit 153.

The haptic module 154 generates various tactile effects that can be sensed by a user. Vibration is a representative one of the tactile effects generated by the haptic module 154. Strength and pattern of the vibration generated by the haptic module 154 are controllable. For instance, different vibrations can be outputted in a manner of being synthesized together or can be outputted in sequence.

The haptic module 154 is able to generate various tactile effects as well as the vibration. For instance, the haptic module 154 generates the effect attributed to the arrangement of pins vertically moving against a contact skin surface, the effect attributed to the injection/suction power of air though an injection/suction hole, the effect attributed to the skim over a skin surface, the effect attributed to the contact with electrode, the effect attributed to the electrostatic force, the effect attributed to the representation of hold/cold sense using an endothermic or exothermic device and the like.

The haptic module 154 can be implemented to enable a user to sense the tactile effect through a muscle sense of finger, arm or the like as well as to transfer the tactile effect through a direct contact. Optionally, at least two haptic modules 154 can be provided to the mobile terminal 100 in accordance with the corresponding configuration type of the mobile terminal 100.

The projector module 155 is the element for performing an image projector function using the mobile terminal 100. And, the projector module 155 is able to display an image, which is identical to or partially different at least from the image displayed on the display 151, on an external screen or wall according to a control signal of the controller 180.

In particular, the projector module 155 can include a light source (not shown in the drawing) generating light (e.g., laser) for projecting an image externally, an image producing element (not shown in the drawing) for producing an image to output externally using the light generated from the light source, and a lens (not shown in the drawing) for enlarging the image for output externally at predetermined focus distance. The projector module 155 can further include a device (not shown in the drawing) for adjusting an image projected direction by mechanically moving the lens or the whole module.

The projector module 155 can be classified into a CRT (cathode ray tube) module, an LCD (liquid crystal display) module, a DLP (digital light processing) module or the like according to a device type of a display means. In particular, the DLP module is operated by the mechanism of enabling the light generated from the light source to reflect on a DMD (digital micro-mirror device) chip and can be advantageous for the downsizing of the projector module 151.

Preferably, the projector module 155 can be provided in a length direction of a lateral, front or backside direction of the mobile terminal 100. It is understood that the projector module 155 can be provided to any portion of the mobile terminal 100 according to the necessity thereof.

The memory unit 160 is generally used to store various types of data to support the processing, control, and storage requirements of the mobile terminal 100. Examples of such data include program instructions for applications operating on the mobile terminal 100, contact data, phonebook data, messages, audio, still pictures, moving pictures, etc. And, a recent use history or a cumulative use frequency of each data (e.g., use frequency for each phonebook, each message or each multimedia) can be stored in the memory unit 160. Moreover, data for various patterns of vibration and/or sound outputted in case of a touch input to the touchscreen can be stored in the memory unit 160.

The memory 160 may be implemented using any type or combination of suitable volatile and non-volatile memory or storage devices including hard disk, random access memory (RAM), static random access memory (SRAM), electrically erasable programmable read-only memory (EEPROM), erasable programmable read-only memory (EPROM), programmable read-only memory (PROM), read-only memory (ROM), magnetic memory, flash memory, magnetic or optical disk, multimedia card micro type memory, card-type memory (e.g., SD memory, XD memory, etc.), or other similar memory or data storage device. And, the mobile terminal 100 is able to operate in association with a web storage for performing a storage function of the memory 160 on the Internet.

The interface unit 170 is often implemented to couple the mobile terminal 100 with external devices. The interface unit 170 receives data from the external devices or is supplied with the power and then transfers the data or power to the respective elements of the mobile terminal 100 or enables data within the mobile terminal 100 to be transferred to the external devices. The interface unit 170 may be configured using a wired/wireless headset port, an external charger port, a wired/wireless data port, a memory card port, a port for coupling to a device having an identity module, audio input/output ports, video input/output ports, an earphone port and/or the like.

The identity module may be realized as a chip for storing various kinds of information for authenticating a use authority of the mobile terminal 100 and can include at least one of a User Identify Module (UIM), Subscriber Identity Module (SIM), Universal Subscriber Identity Module (USIM) and/or the like. A device having the identity module (hereinafter called 'identity device') can be manufactured as a smart card. Therefore, the identity device is connectible to the mobile terminal 100 via the corresponding port.

When the mobile terminal 110 is connected to an external cradle, the interface unit 170 becomes a passage for supplying the mobile terminal 100 with a power from the cradle or a passage for delivering various command signals inputted from the cradle by a user to the mobile terminal 100. Each of the various command signals inputted from the cradle or the power can operate as a signal enabling the mobile terminal 100 to recognize that it is correctly loaded in the cradle.

The controller 180 typically controls the overall operations of the mobile terminal 100. For example, the controller 180 performs the control and processing associated with voice calls, data communications, video calls, etc. The controller 180 may include a multimedia module 181 that provides multimedia playback. The multimedia module 181 may be configured as part of the controller 180, or implemented as a separate component. Moreover, the controller 180 is able to perform a pattern recognizing process for recognizing a writing input and a picture drawing input carried out on the touchscreen as characters or images, respectively.

The power supply unit 190 provides power required by the various components for the mobile terminal 100. The power may be internal power, external power, or combinations thereof.

Various embodiments described herein may be implemented in a computer-readable medium using, for example, computer software, hardware, or some combination thereof. For a hardware implementation, the embodiments described herein may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a selective combination thereof. Such feature may also be implemented by the controller 180.

For a software implementation, the embodiments described herein may be implemented with separate software modules, such as procedures and functions, each of which perform one or more of the functions and operations described herein. The software codes can be implemented with a software application written in any suitable programming language and may be stored in memory such as the memory 160, and executed by a controller or processor, such as the controller 180.

Figure 2:
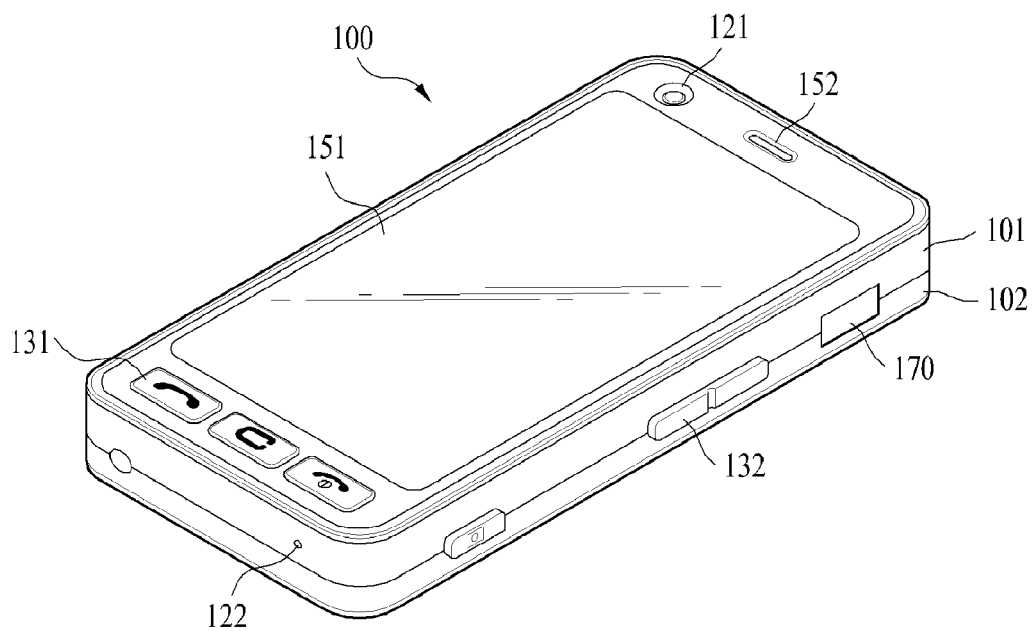
FIG. 2 is a front perspective diagram of a mobile terminal according to one embodiment of the present invention.

FIG. 2 is a front perspective diagram of a mobile terminal according to various embodiments of the present invention. The mobile terminal 100 is shown as a bar type terminal body, but the mobile terminal may alternative be implemented using other configuration such as folder-type, slide-type, rotational-type, swing-type, combinations thereof, and the like. For clarity, further disclosure will primarily relate to a bar-type mobile terminal 100, but such teachings apply equally to other types of mobile terminals.

Referring still to FIG. 2, the mobile terminal 100 includes a case (casing, housing, cover, etc.) configuring an exterior thereof. The case is shown divided into a front case 101 and a rear case 102. Various electric/electronic parts are positioned or otherwise located in a space or cavity provided between the front and rear cases 101 and 102. Optionally, at least one middle case can be further provided between the front and rear cases 101 and 102. The cases 101 and 102 may be formed by injection molding of synthetic resin or they can be formed of metal substance such as stainless steel (STS), titanium (Ti) or the like, for example.

A display 151, an audio output unit 152, a camera 121, user input units 130/131 and 132, a microphone 122, an interface 180 and the like can be provided to the terminal body, and more particularly, to the front case 101.

The display 151 is shown occupying the majority of a main face of the front case 101. The audio output unit 151 and the camera 121 are provided to an area adjacent to one of both end portions of the display 151, while the user input unit 131 and the microphone 122 are provided to another area adjacent to the other end portion of the display 151. The user input unit 132 and the interface 170 can be provided to lateral sides of the front and rear cases 101 and 102.

The input unit 130 is manipulated to receive a command for controlling an operation of the terminal 100. The input unit 130 may also include a plurality of manipulating units 131 and 132. The manipulating units 131 and 132 will sometimes be referred to herein as a manipulating portion and they may implement any mechanism of a tactile manner that enables a user to perform a manipulation action by experiencing a tactile feeling.

Content inputted by the first or second manipulating unit 131 or 132 can be diversely set. For instance, such a command as start, end, scroll and the like is inputted to the first manipulating unit 131. A command for volume adjustment of sound outputted from the audio output unit 152, a command for switching to a touch recognizing mode of the display 151 or the like can be inputted to the second manipulating unit 132.

Moreover, various kinds of visual information can be displayed on the display 151. Such information can be displayed in characters, numerals, symbols, graphics, icons and the like. In order to input the information, at least one of the characters, numerals, symbols, graphics and icons are represented as a single predetermined array to be implemented in a keypad formation. This keypad formation is also referred to as 'soft keys'.

Further, the display 151 is operable through an entire area or by being divided into a plurality of regions. In the latter case, a plurality of the regions can be configured interoperable.

In addition, the display 151 or the touchpad 135 can be configured to receive a touch input by scroll. A user scrolls the display 151 or the touchpad to shift a cursor or pointer located at an entity (e.g., icon or the like) displayed on the display 151. Furthermore, in case that a finger is shifted on the display 151 or the touchpad, a path of the shifted finger can be visually displayed on the display 151. This may be useful in editing an image displayed on the display 151.

Consider the scenario in which both the display (touch screen) 151 and the touchpad are touched together within a predetermined or threshold time range, thus causing one function of the terminal can be executed. This simultaneous touch example may correspond to a case that the terminal body is held by a user using a thumb and a first finger (clamping). The above function can include activation or deactivation for the display 151 or the touchpad 135.

Meanwhile, such a graphic for pointing at a specific object on a display unit or selecting a menu from the display unit as an arrow, a finger and the like is called a pointer or a cursor. Yet, the pointer is frequently used to mean a finger, a stylus pen or the like for a touch manipulation and the like. In order to clearly discriminate the pointer and the cursor from each other in this disclosure, a graphic displayed on a display unit is named a cursor and such a physical means for performing a touch, a proximity touch, a gesture and the like as a finger, a stylus pen and the like is named a pointer.

For clarity and convenience of the following description, a mobile terminal mentioned in the following description is assumed as including at least one of the components shown in FIG. 1.

Figure 3:
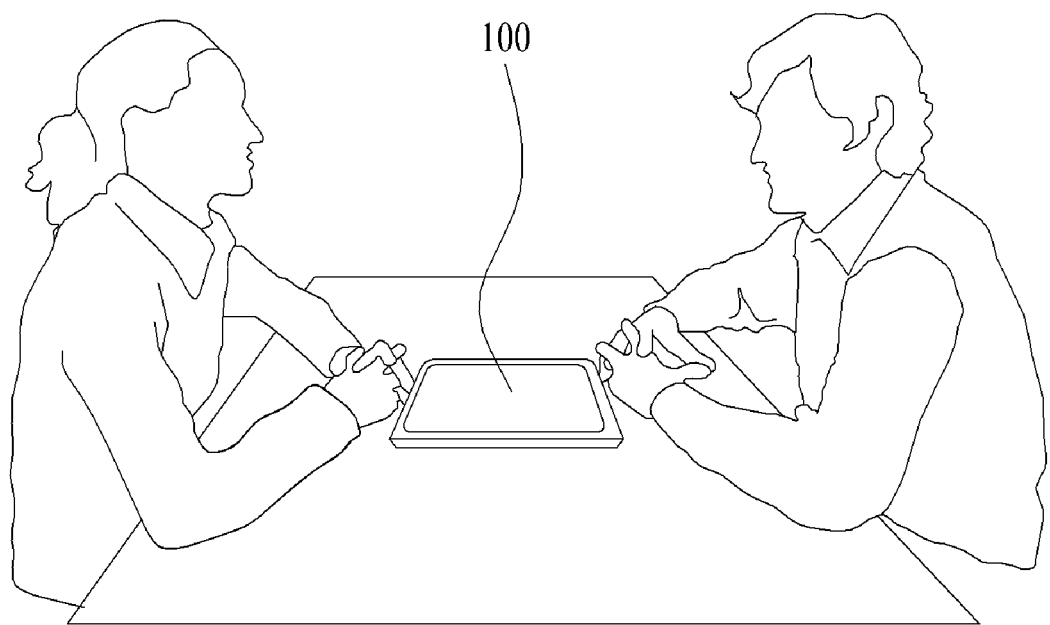
FIG. 3 is a diagram for one example of a situation in which a mobile terminal according to an embodiment of the present invention is used.

FIG. 3 is a diagram for one example of a situation in which a mobile terminal according to an embodiment of the present invention is used.

Referring to FIG. 3, when two users are sitting face to face by placing a mobile terminal 100 in-between, if the mobile terminal 100 is used by a general method, one of the two users watches a content displayed on the display unit 151 upside down or both of the users watch a content turned in a vertical direction. As such a mobile terminal provided with a touchscreen as a tablet PC and the like is distributed and more various functions are supported, such a situation may take place more often due to an increasing frequency of use to cause inconvenience to users.

Sharing of Touchscreen Through Screen Partition

According to one embodiment of the present invention, a boundary line is set on a display unit of a mobile terminal, a region of the display unit is partitioned into two parts centering on the boundary line, images reverse to each other at 180 degrees may be displayed on the two parts, respectively.

In the following description, the screen partition and a rotational content display type according to the present embodiment are explained in detail with reference to FIG. 4.

Figure 4:
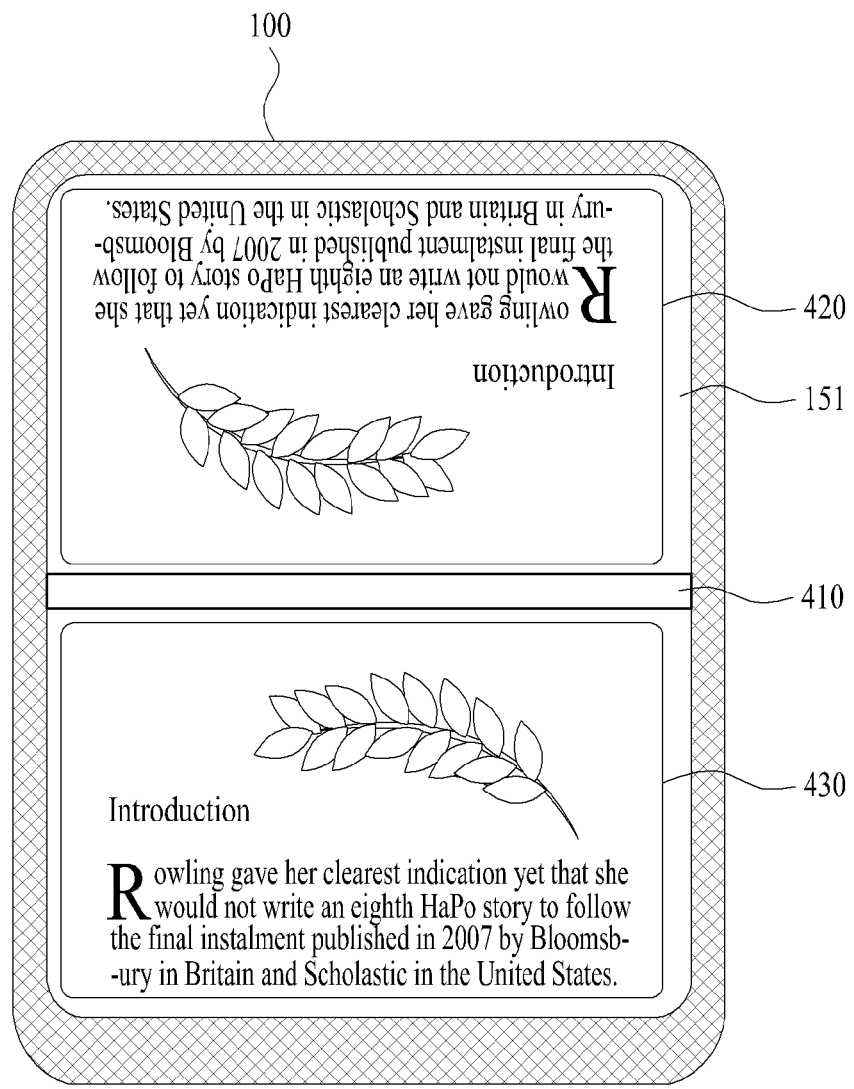
FIG. 4 is a diagram for one example of performing the screen partition in a mobile terminal according to one embodiment of the present invention.

FIG. 4 is a diagram for one example of performing the screen partition in a mobile terminal according to one embodiment of the present invention.

Referring to FIG. 4, a bar 410 may be displayed in a horizontal direction on a middle part of the display unit 151 of the mobile terminal 100. And, the display unit 151 may be partitioned into top and bottom. With reference to the bar 410, preferably the same contents are displayed on a top region 420 and a bottom region 430, respectively. And, the contents are displayed in a manner of being rotated at 180 degrees against each other. However, it may be possible to provide the content of the first region to the second region after finishing the amendment. Thus, with respect to the time, there might be a difference in the displayed content.

After the screen has been partitioned in the above configuration, as the contents are displayed on the partitioned regions in a manner of being rotated or mirrowed, respectively, at least two users may conveniently share one display unit in opposite directions.

Although the meaning of the above-mentioned 180-degree rotation may not coincide with that of mirroring (i.e., top-bottom/right-left reversion), for clarity, the aforesaid screen partition and the 180-degree rotation may be named 'mirroring' altogether in this specification. Moreover, a bar playing a role as a reference for the partition shall be named a mirroring bar. Meanwhile, after the mirroring has been performed, it may cause a problem 'which region will be used to receive an input of a command for scrolling a content or an input of a command for activating a specific function'. For clarity, the authority for inputting such a command shall be named 'control authority' in the present invention. For instance, in the situation shown in FIG. 4, if the control authority is granted to the bottom region 430 with reference to the mirroring bar 410, the controller 180 may recognize a touch input via the bottom region 430 but may ignore a touch input applied to the top region 420.

The control authority may be granted to one of the two screens or may be simultaneously granted to both of the two screens. This shall be described in detail later.

A procedure for the aforesaid mirroring from triggering to ending is described with reference to FIG. 5 as follows.

Figure 5:
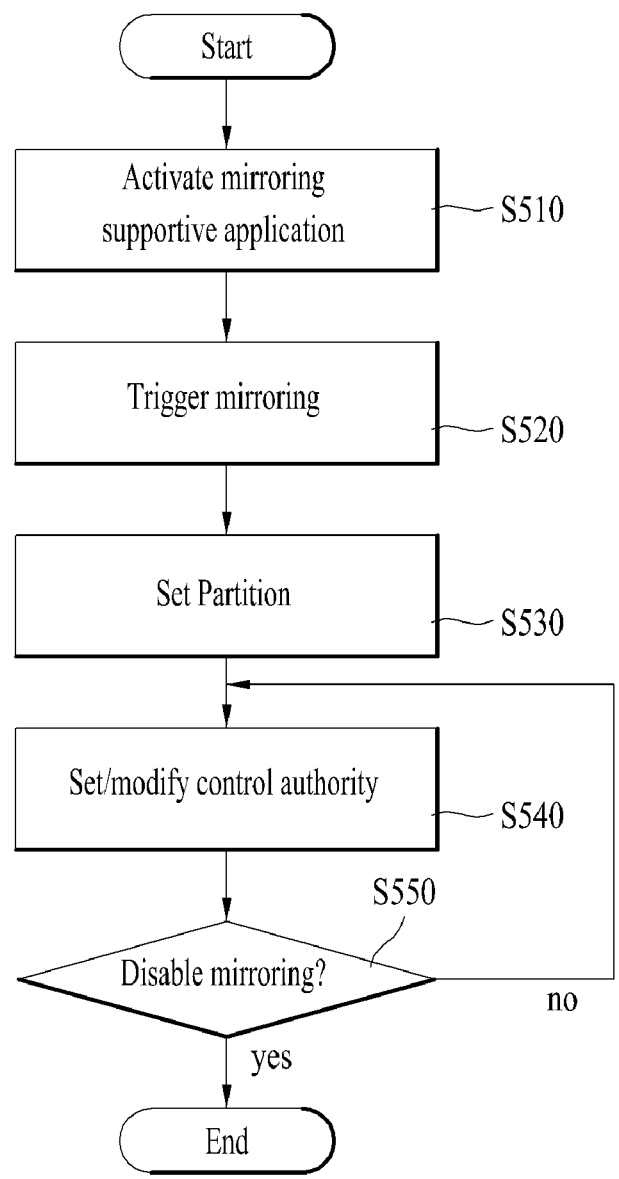
FIG. 5 is a flowchart for one example of a procedure for performing a mirroring function in a mobile terminal according to one embodiment of the present invention.

FIG. 5 is a flowchart for one example of a procedure for performing a mirroring function in a mobile terminal according to one embodiment of the present invention.

Referring to FIG. 5, an application supporting a mirroring function may be activated in accordance with a decision made by the controller 180 or an input of a user command [S510].

The activation in accordance with the decision made by the controller 180 may include a case that an activation of an application is scheduled in advance, a case that an activation of a corresponding application is mandatory for a process for executing a different command, and/or the like. In this case, the user command input may include an input via a hardware key button provided to a mobile terminal or a touch input via a touchscreen. Moreover, the user command input may include a command inputted from a device connected by wire via the interface unit 170 or a command remotely inputted via a wireless signal. The application generally means an application program executed in an operating system or may mean an operating system itself. In particular, if the mirroring is supported by an operating system stage, the present function may be applicable irrespective of a type of an application.

While a mirroring supportive application is being executed or activated, the mirroring may be triggered in accordance with a user command input [S520]. Of course, the mirroring may be automatically triggered as soon as an application is activated in accordance with the setting of the application.

Thereafter, a mirroring region may be settable [S530].

In this case, the mirroring region may mean regions generated from setting partitions by a mirroring bar. Hence, 'setting a mirroring region (or setting partition)' may mean that a mirroring bar is arranged. Of course, the mirroring bar may be displayed through a prescribed visual effect or may not be separately displayed.

After completion of the setting of the mirroring region, it is able to select/modify whether to perform a control through which mirroring region, i.e., whether a control authority will be granted to which mirroring region.

The control authority granted region may be set to a default value per application. Alternatively, after completion of the setting of the mirroring region, a menu and/or icon for granting a control authority is displayed, it may be then able to grant the control authority to the mirroring region with a command input via the displayed menu and/or icon.

Thereafter, a command for canceling or disabling the mirroring is inputted. Alternatively, if the corresponding application is terminated, the mirroring function may be disabled [S550].

Triggering of Mirroring & Setting of Mirroring region

In the following description, a method of triggering a mirroring and a method of setting a mirroring are explained in detail with reference to FIGS. 6 to 8.

Figure 6:
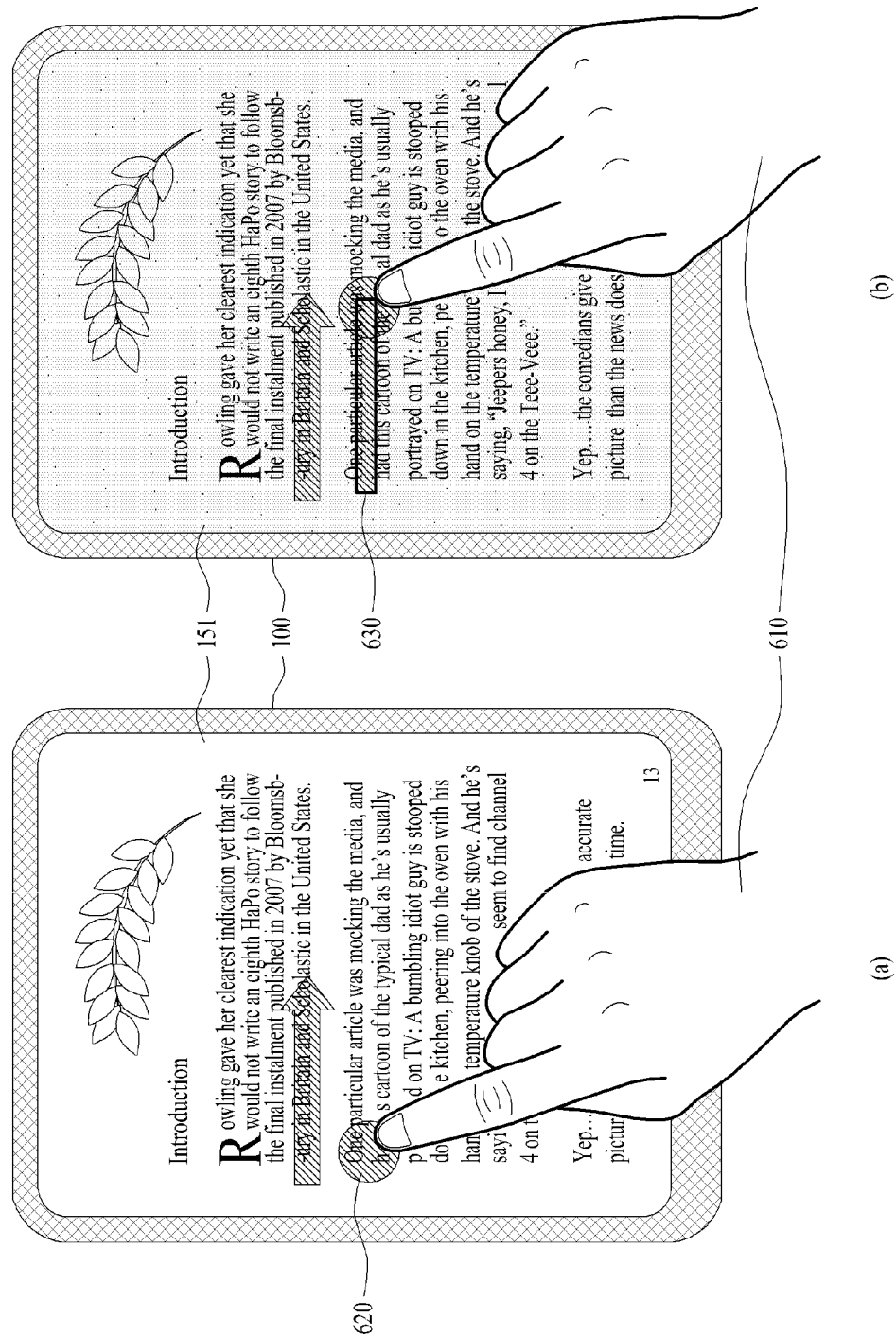
FIG. 6 is a diagram for one example of a method for setting a mirroring region by triggering mirroring in a mobile terminal according to one embodiment of the present invention.

FIG. 6 is a diagram for one example of a method for setting a mirroring region by triggering mirroring in a mobile terminal according to one embodiment of the present invention.

Referring to FIG. 6 (*a*), if a user applies a multi-touch to an edge region 620 of the display unit 151 using a pointer 610, the controller 180 may display content used to be displayed on the display unit 151 in a manner of dimming the content to indicate that the mirroring is triggered.

Generally, a multi-touch means that touch inputs are applied to at least two different points, respectively. Yet, the multi-touch mentioned in this invention may conceptionally include a case that a size of touched points is equal to or greater than a predetermined value despite no matter how many points are touched (e.g., a case that two fingers come in contact with each other).

Subsequently, the user may drag the pointer 610 in a desired partition direction from the touch point while maintaining the multi-touch [FIG. 6 (*b*)]. As the pointer is dragged, a mirroring bar 630 may be sequentially displayed in accordance with a drag trace. Once the pointer 610 arrives at an edge on the side opposing the initial touch point 620, the setting of the mirroring bar 630 is completed, According to the completion of the mirroring bar 630, the mirroring region may be fixed and 180-degree rotation of the content may be then performed. In doing so, it may be necessary to determine whether the content displayed on the bottom mirroring region with reference to the mirroring bar is rotated at 180 degrees to be displayed on the top mirroring region, and vice versa. This may be set to follow a default value of the mirroring supportive application.

Before the drag trace arrives at an edge of an opposing side from an edge of one side of the touchscreen 151, if the multi-touch is cancelled or the pointer goes back to the drag start point, the triggering of the mirroring may be canceled by brightening the screen.

FIG. 6 exemplarily shows that the multi-touch is inputted to one edge for the triggering, by which the present invention is non-limited. Alternatively, the description with reference to FIG. 6 may be applicable to such an input as a long touch, a long multi-touch and the like.

Meanwhile, as a result of the mirroring triggered by the method shown in FIG. 6, after both of the setting of the mirroring region and the grant of the control authority have been completed, the mirroring function may be canceled in a manner of applying a multi-touch or a long touch to the mirroring bar again or in a manner of applying a multi-touch to the edge of the mirroring bar and then dragging the pointer to the opposing edge. In case that the pointer is dragged, it may be able to display a visual effect that the mirroring bar disappears along a trace of the pointer.

Figure 7:
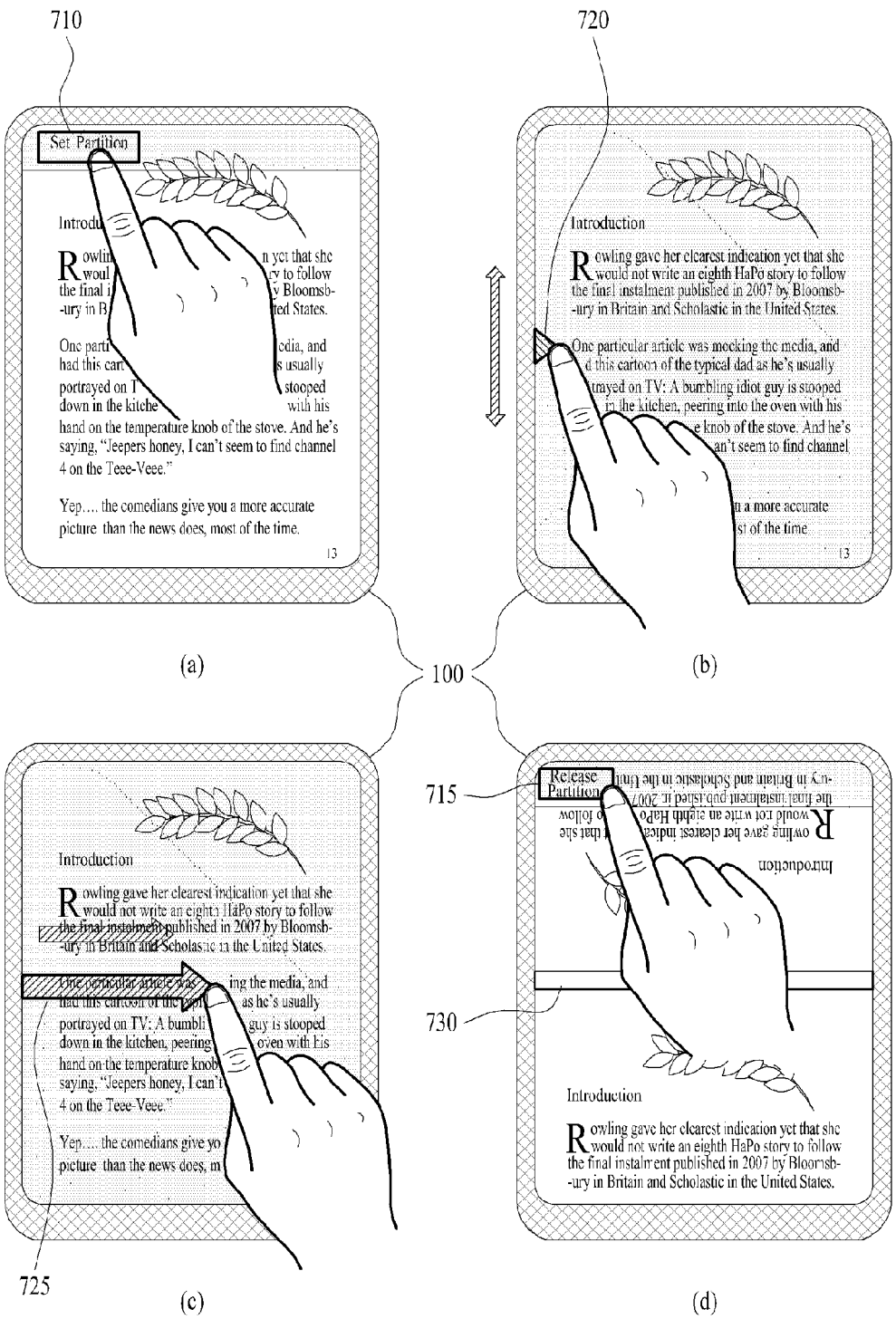
FIG. 7 is a diagram for another example of a method for setting a mirroring region by triggering mirroring in a mobile terminal according to one embodiment of the present invention.

FIG. 7 is a diagram for another example of a method for setting a mirroring region by triggering mirroring in a mobile terminal according to one embodiment of the present invention.

Referring to FIG. 7 (a), when an application supportive of a mirroring is activated, a mirroring icon 710 for setting partition may be displayed on a prescribed region of the touchscreen 151. In particular, the mirroring icon 170 may be displayed all the time while the corresponding application is activated. Alternatively, when such a touch input as a long touch is applied to a specific region of a screen, the mirroring icon 170 may be displayed. Once the mirroring icon 710 is selected through the touch input, a guide icon 720 for a position setting of a mirroring bar may be displayed on an edge of one side of the touchscreen 151 by dimming the screen [FIG. 7 (b)]. In this case, the guide icon 720 may determine a start height of the mirroring bar in a manner of moving up and down through a touch & drag input. After a user has been determined the start height, referring to FIG. 7 (c), if the guide icon 720 is dragged or flicked in a horizontal direction, the mirroring bar may be displayed along a drag trace.

If a vertical position of the mirroring bar is changed in accordance with a position of the guide icon 720, a size of each mirroring region partitioned with reference to the mirroring bar may be set asymmetric.

Meanwhile, after the mirroring function has been activated through the procedure shown in FIGS. 7 (a) to 7 (c), if the user selects a mirroring canceling icon 715 for releasing partition, referring to FIG. 7 (d), the mirroring function may be disabled. In particular, the mirroring canceling icon 715 may be displayed all the time in the course of activating the mirroring function. Alternatively, the mirroring canceling icon 715 may be displayed only if a specific command is inputted.

Although FIG. 7 shows the case that the mirroring icon is displayed in accordance with a manipulation of the touchscreen only, if a hardware key button is provided to the mobile terminal, it may be able to page a mirroring icon using the hardware key button. This may be described with reference to FIG. 8 as follows.

Figure 8:
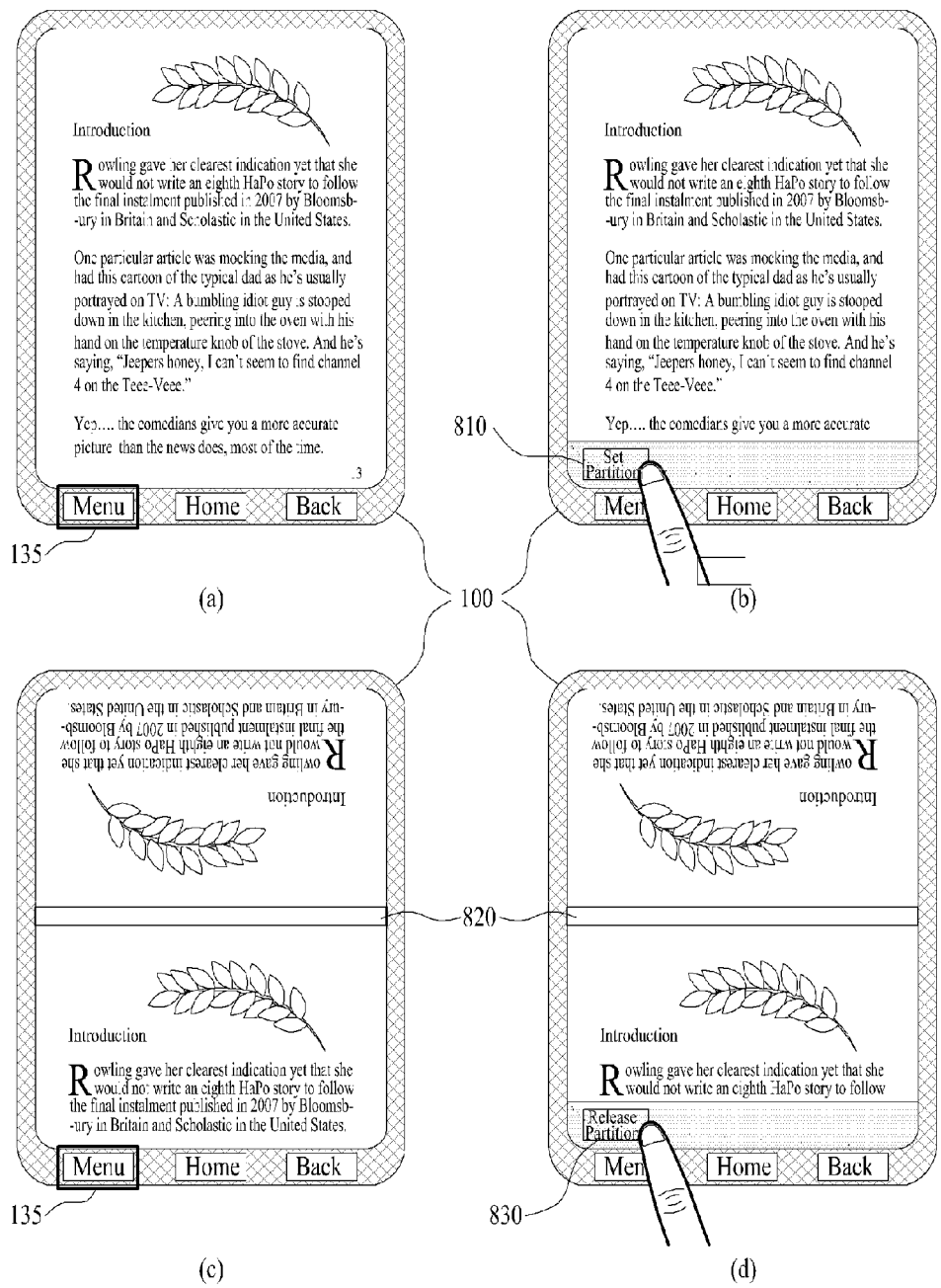
FIG. 8 is a diagram for further example of a method for setting a mirroring region by triggering mirroring in a mobile terminal according to one embodiment of the present invention.

FIG. 8 is a diagram for further example of a method for setting a mirroring region by triggering mirroring in a mobile terminal according to one embodiment of the present invention.

Referring to FIG. 8 (a), a plurality of hardware key buttons may be provided to a bottom of the mobile terminal 100. In particular, each of the hardware key buttons may include a push button or a touch sense button. If a key button 135 for a menu paging is selected from a plurality of the hardware key buttons, referring to FIG. 8 (b), a mirroring icon 810 for setting partition may be displayed. If the mirroring icon 810 is selected, referring to FIG. 8 (c), a mirroring bar 810 may be set in the middle of the touchscreen. In particular, a vertical position of the mirroring bar 820 may be adjusted through a touch & drag input. Thereafter, if a user manipulates the key button 135 again, referring to FIG. 8 (d), a mirroring canceling icon 830 for releasing partition may be displayed. If the mirroring canceling icon 830 is selected, a mirroring function may be disabled.

Grant & Change of Control Authority

In the following description, the grant and change of a control authority are explained in detail with reference to FIG. 9 and FIG. 10.

First of all, as mentioned in the foregoing description, while a mirroring region is set, the control authority may mean the authority for inputting a command for scrolling content or activating a specific function via the mirroring region situated in a user's direction in view point of a user. On the other hand, in viewpoint of the controller 180, the control authority may mean whether to recognize a command inputted via a prescribed mirroring region. Hence, a content displayed on the mirroring region having the control authority may be displayed on the rest of mirroring regions, as it is, in a manner of being rotated at 180 degrees. If a content is revised in a mirroring region having the control authority, a content displayed on the rest of mirroring regions may be correspondingly revised. For instance, if a document displayed on a mirroring region having the control authority is scrolled, a document displayed on the rest of mirroring regions may be scrolled together. If the control authority is granted to all mirroring regions, all operations executed in the mirroring regions affect each other.

Figure 9:
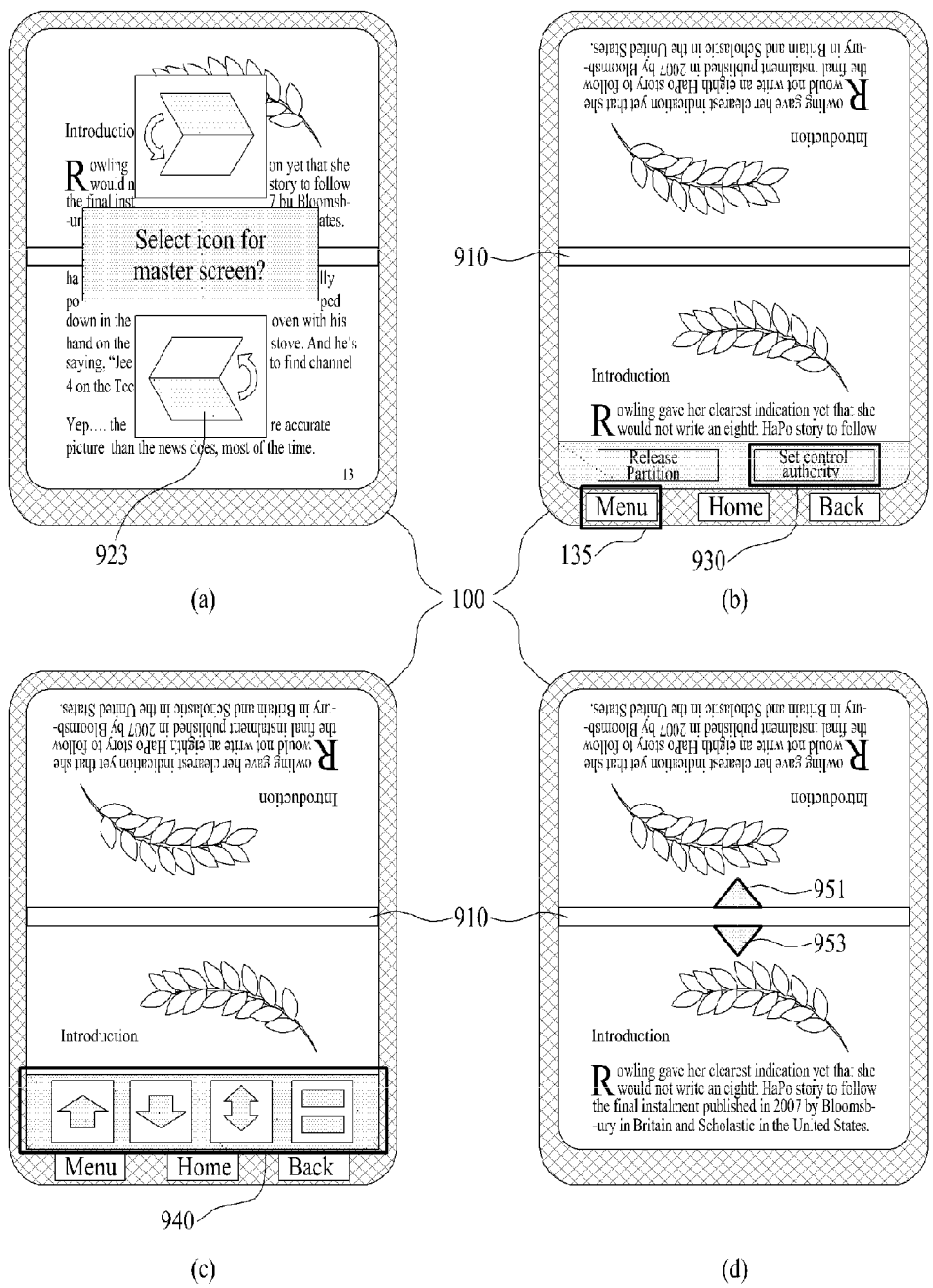
FIG. 9 is a diagram for one example of a method for granting the control authority for mirroring in a mobile terminal according to one embodiment of the present invention.

FIG. 9 is a diagram for one example of a method for granting the control authority for mirroring in a mobile terminal according to one embodiment of the present invention.

In FIG. 9, assume a case after completion of the setup of a mirroring region. In this case, the case after the completion of the mirroring region setup may mean the case right after the completion of the setup of the mirroring region by one of the methods described with reference to FIGS. 6 to 8 or may mean a state that a mirroring function is completely activated according to the completion of the control authority setup in advance. The completion of the control authority setup in advance may mean a status that the control authority has been granted to at least one mirroring region as a default according to basic application setup or a status that the control authority is granted to at least one mirroring region by one of the following methods.

Referring to FIG. 9 (a), after a mirroring has been triggered, a mirroring region setup is completed. Alternatively, if a control authority setup is already completed, a user inputs a prescribed command. If so, control authority grant icons 921 and 923 may be displayed on two mirroring regions divided with reference to a mirroring bar 910, respectively. If at least one of the two icons 921 and 923 is selected by a touch input, a control authority may be granted to the selected mirroring region.

Referring to FIG. 9 (b), a hardware key button 135 for a menu paging may be provided to a bottom side of the mobile terminal 100. If a user selects the corresponding key button 135, a control authority setting icon 930 may be displayed. If the control authority setting icon 930 is selected, referring to FIG. 9 (c), a plurality of control authority grant icons 940 are displayed on a bottom side of the touchscreen. Regarding functions of the control authority grant icons 940, a far left icon may indicate a control authority grant to a top region above a mirroring bar, a middle left icon may indicate a control authority grant to a bottom region below the mirroring bar, a middle right icon may indicate a control authority grant to both of the top and bottom regions, and a far right icon may indicate an independent control authority grant. Effects according to the selection of each icon shall be described in detail with reference to FIGS. 11A to 11D later.

The above-described process shown in FIG. 9 (b) and FIG. 9 (c) may be applicable to amend a control authority granted in advance. After the mirroring has been triggered, the control authority grant icons may be displayed, as shown in FIG. 9 (c), right after the completion of the mirroring region setup.

Alternatively, referring to FIG. 9D, control authority grant icons 951 and 953 may be displayed in the vicinity of a mirroring bar 910. Each time the control authority grant icon 951 or 953 is selected, the control authority may be granted or withdrawn by toggling. For instance, if the control authority grant icon is initially selected, a prescribed visual effect indicating that the control authority is granted may be displayed on the corresponding icon. If the initially selected control authority grant icon is selected again, the visual effect may disappear to indicate that the granted control authority is withdrawn. After the mirroring has been triggered, if the mirroring region setup is completed, the control authority grant icons 951 and 953 may be instantly displayed. Moreover, each of the control authority grant icons 951 and 953 may be paged through a prescribed command input despite that the control authority grant has been completed. After each of the control authority grant icons 951 and 953 has been selected through a touch input, it may disappear after prescribed duration. If the mirroring bar 910 is touched, the corresponding control authority grant icon may be displayed again.

Meanwhile, the control authority grant can be performed in accordance with a position of an icon of which position is changeable. This may be described in detail with reference to FIG. 10 as follows.

Figure 10:
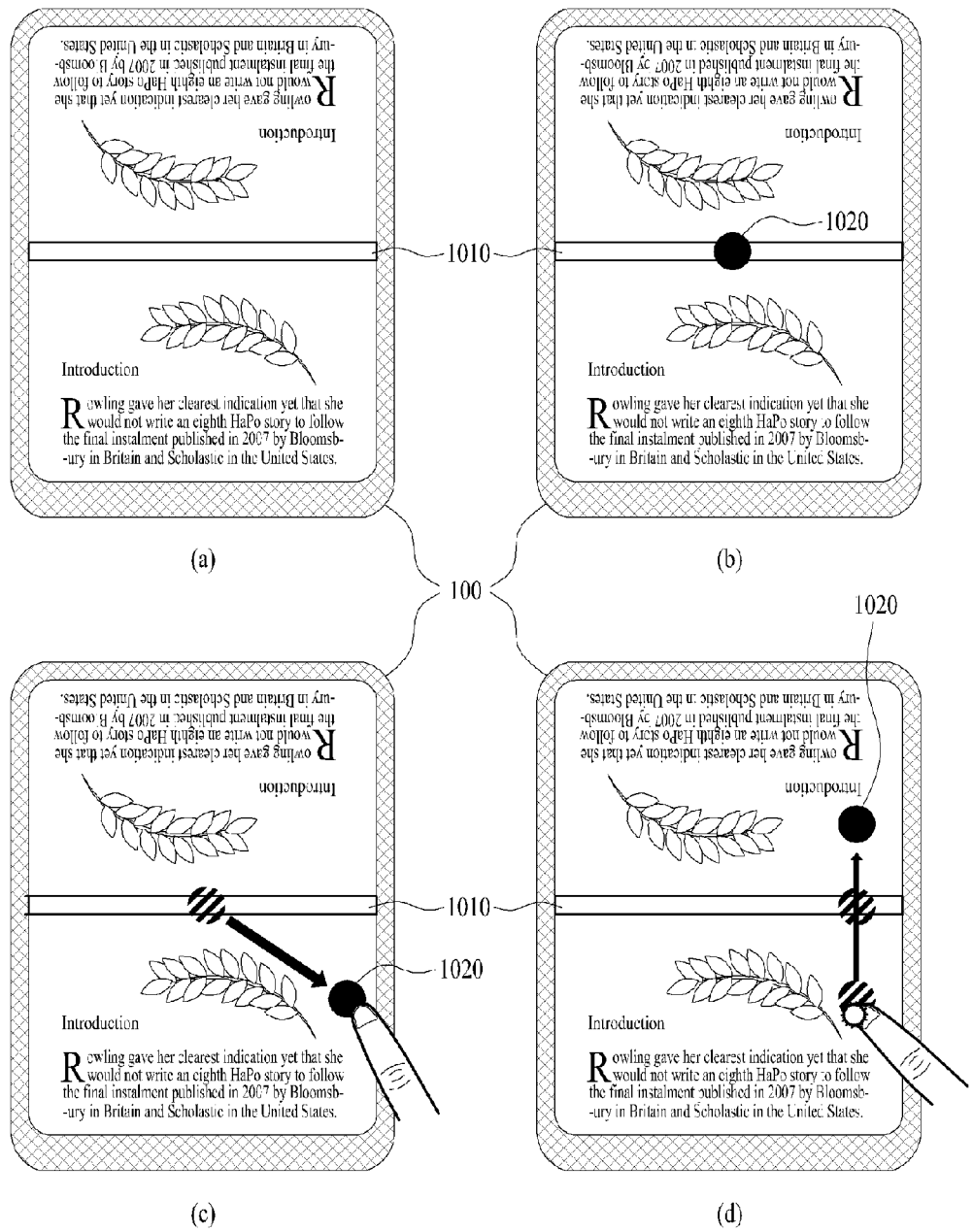
FIG. 10 is a diagram for another example of a method for granting the control authority for mirroring in a mobile terminal according to one embodiment of the present invention.

FIG. 10 is a diagram for another example of a method for granting the control authority for mirroring in a mobile terminal according to one embodiment of the present invention.

Referring to FIG. 10, in a status that a mirroring region setup has been completed, if a user touches or long-touches a mirroring bar 1010 [FIG. 10 (*a*)], an authority icon 1020 may be displayed at the center of the mirroring bar 1010. In this case, a position of the authority icon 102 may be changed in accordance with a touch & drag input or a flicking touch input applied thereto. And, the controller 180 may be able to recognize an input applied to a region where the authority icon 1020 is situated only. In particular, the mirroring region having the authority icon 1020 situated therein may mean the region to which the control authority is given. Hence, in such a situation as shown in FIG. 10 (*b*), the control authority is granted to both of the mirroring regions.

Referring to FIG. 10 (*c*), if a user shifts the authority icon 1020 to a bottom region below the mirroring bar 1010 by inputting a touch & drag, a control authority may be granted to the mirroring region on the bottom. In case that a user of the bottom mirroring region intends to pass the control authority to the top mirroring region, referring to FIG. 10 (*d*), the user may be able to shift the authority icon 1020 over the mirroring bar 1010 by applying a flicking touch to the authority icon 1020 in a top direction.

Although FIG. 10 exemplarily shows that a specific touch input is applied to a mirroring bar to page an authority icon, the corresponding authority icon may be paged using a different kind of command input. Besides, an initially displayed position of an authority icon may be changed to a last disappearing position or a preset position of the corresponding authority icon.

Types of Control Authority

In the following description, types of control authority may be described with reference to FIGS. 11A to 11D. The control authorities according to the present invention may be classified into a dependent type and an independent type. In particular, the dependent type can be classified into a single type and a coherence type again.

FIGS. 11A to 11D are diagrams for describing types of the control authority according to one embodiment of the present invention.

First of all, a single dependent type control authority may be described with reference to FIG. 11A as follows.

A single dependent type control authority may mean a control authority granted to a single mirroring region only. In particular, a result of a control performed in the control authority granted region may be reflected by the rest of mirroring regions as it is.

Figure 11A:
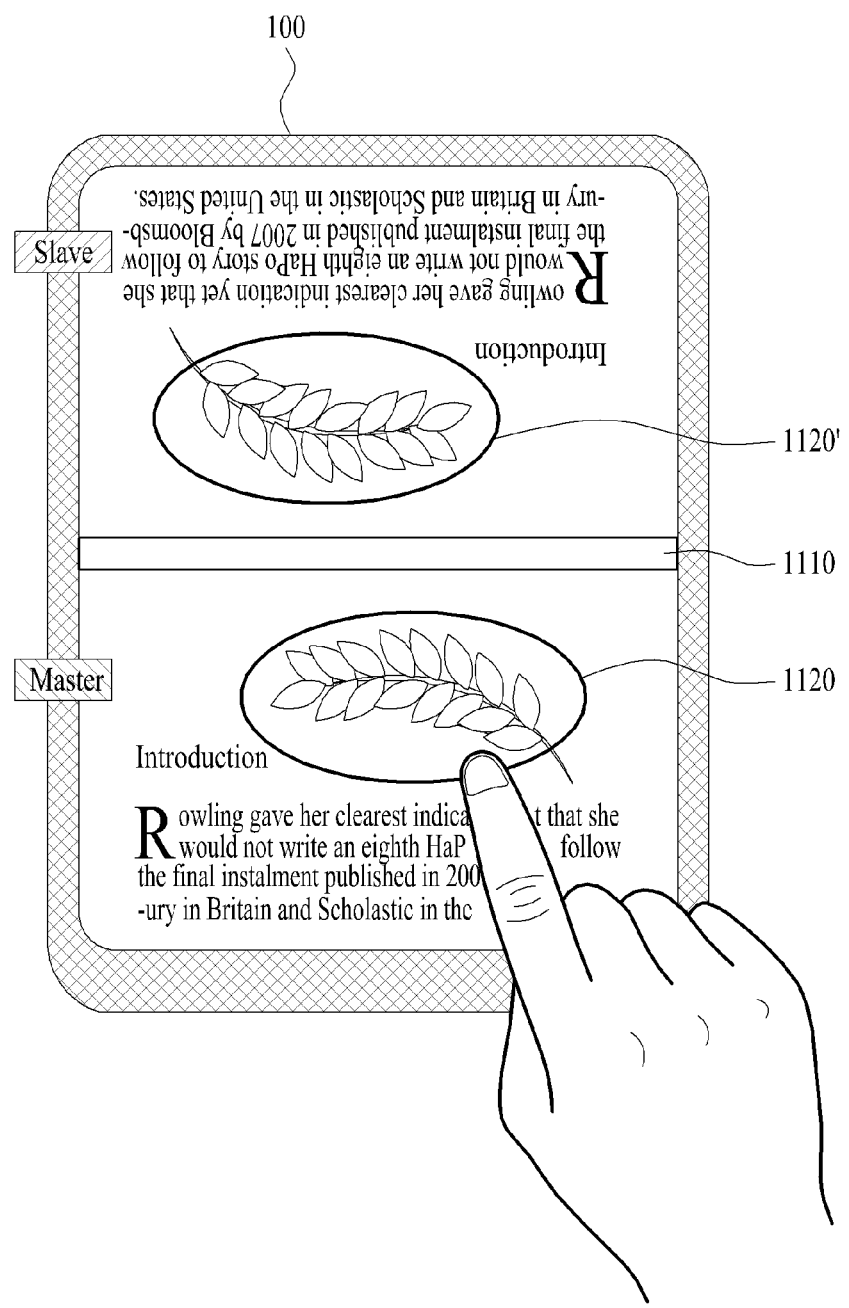
FIGS. 11A to 11D are diagrams for describing types of the control authority according to one embodiment of the present invention.

Referring to FIG. 11A, assume a case that the control authority is granted to a mirroring region below a mirroring bar 1110 in accordance with a default setting or one of the aforesaid control authority granting methods. On such assumption, if a user draws a figure 1120 on a bottom mirroring region using a memo function, a figure 1120' identical to the former figure drawn on the bottom mirroring region may be displayed on a top mirroring region in a manner that a shape/position of the former figure 1120 is rotated at 180 degrees. In this case, the control authority granted region may be named a master region, while a region different from the control authority granted region may be named a slave region. Consequently, in a situation that the single dependent type control authority is applied, a content displayed on the master region may be displayed as it is on the slave region in a manner of being rotated at 180 degrees.

In the following description, a coherence dependent type control authority may be described with reference to FIG. 11B.

First of all, a coherence dependent type control authority may mean the control authority granted to a plurality of mirroring regions. In particular, a result of a control performed on each of the control authority granted regions may be reflected by the rest of the mirroring regions.

Figure 11B:
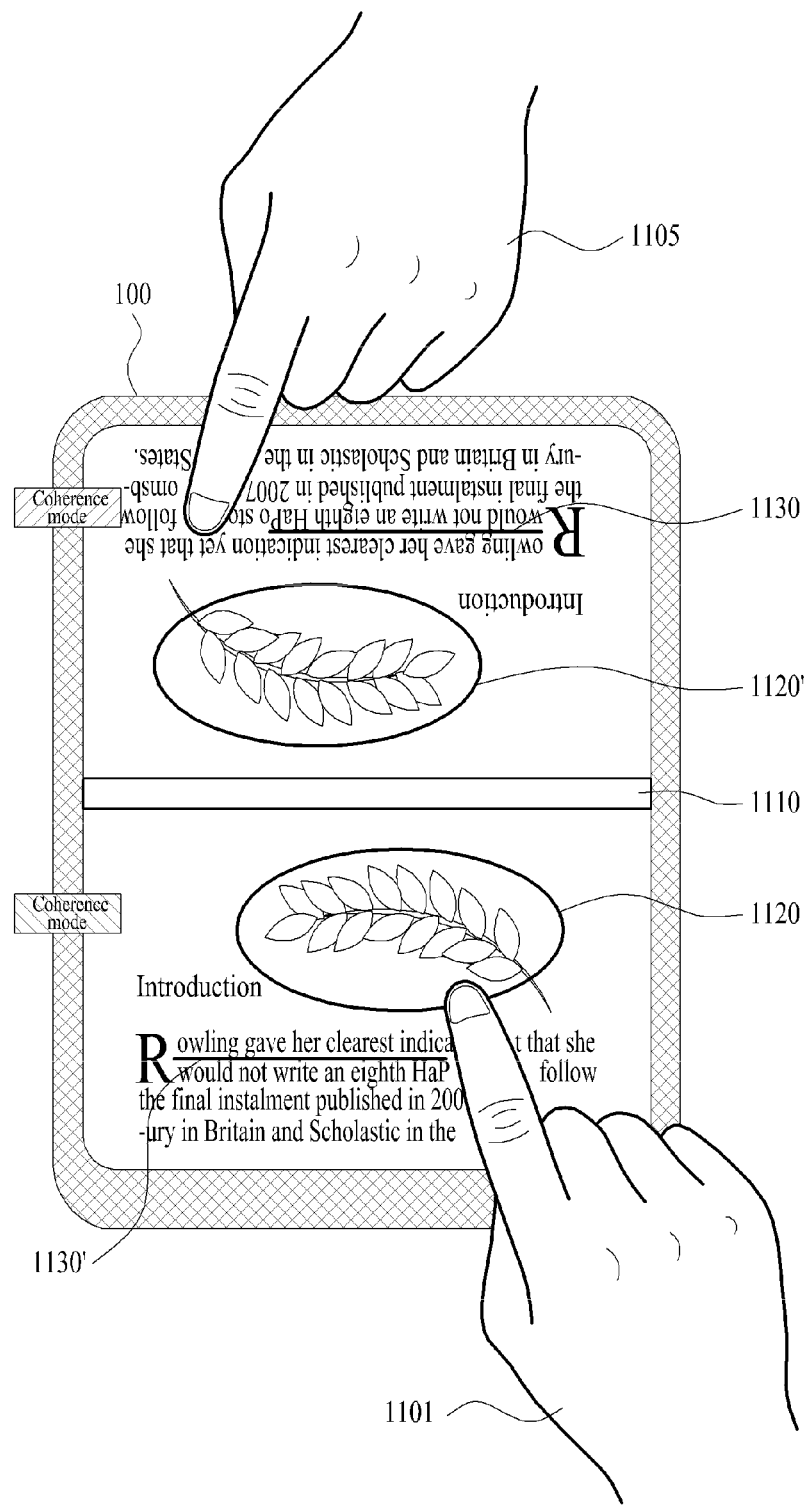

Referring to FIG. 11B, assume a case that the control authority is granted to both of top and bottom regions with reference to a mirroring bar 1110 in accordance with a default setting or one of the aforesaid control authority granting methods. On such assumption, a figure 1120' appears at a corresponding point on a top mirroring region in a manner that a figure 1120 drawn on a bottom mirroring region via a pointer 1101 of a user of the bottom mirroring region is rotated at 180 degrees, which is similar to FIG. 11A. Yet, since a dependent type control authority is granted to the top mirroring region above the mirroring bar 1110, a highlight 1130', which is identical to a highlight 1130 drawn on the bottom mirroring region by a pointer 1105 of a user of the top mirroring region, may be displayed on a corresponding point of the top mirroring region as well.

In the following description, an independent type control authority may be described with reference to FIG. 11C.

First of all, an independent type control authority may mean the control authority granted to a plurality of mirroring regions. Yet, a result of a control performed on each of the control authority granted regions may not be reflected by the rest of the mirroring regions.

Figure 11C:
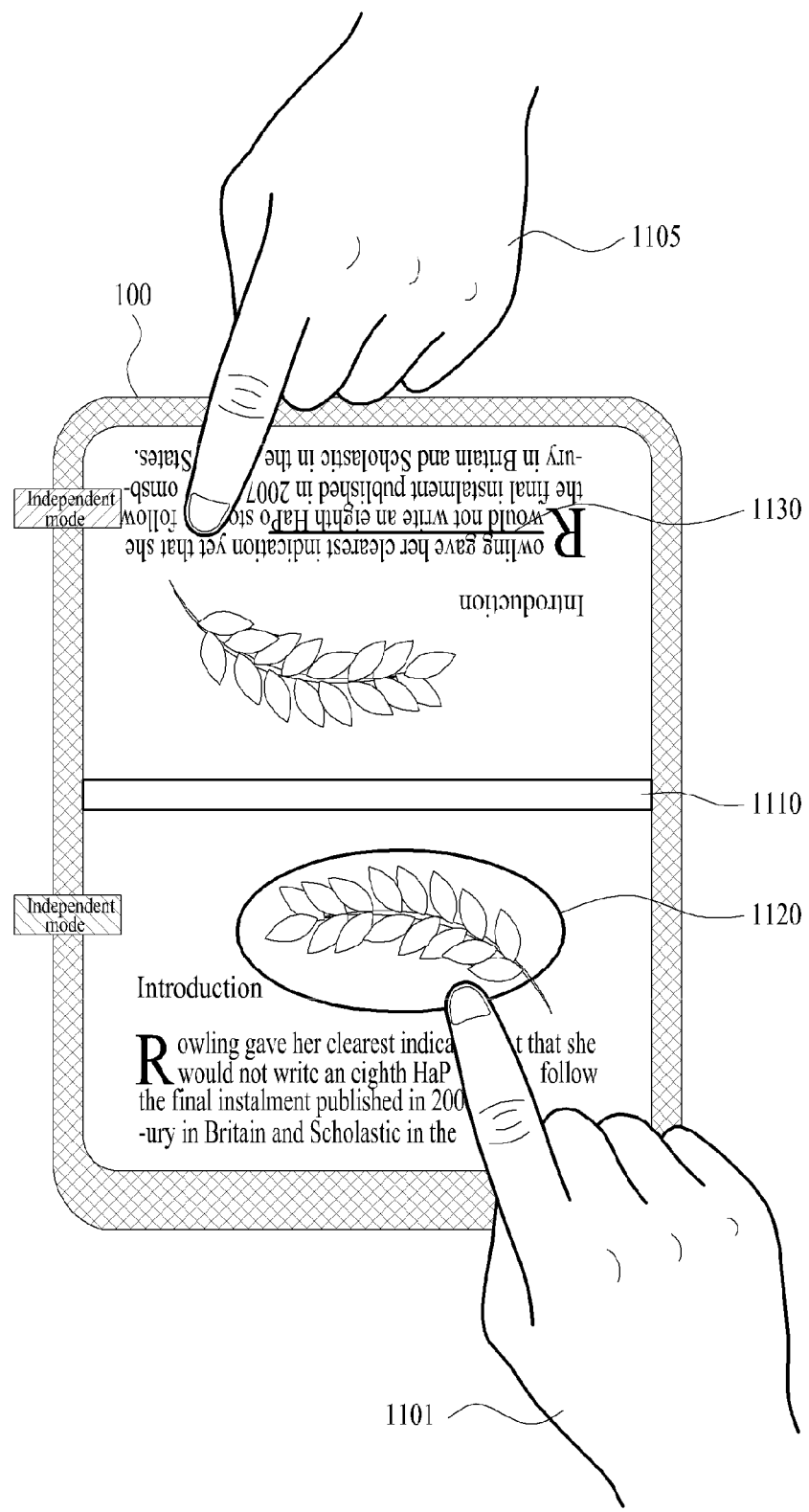

Referring to FIG. 11C, assume a case that an independent type control authority is granted to both of top and bottom regions with reference to a mirroring bar 1110 in accordance with a default setting or one of the aforesaid control authority granting methods. For instance, the independent type control authority may be granted if the far right icon is selected to the control authority grant icons 940 described with reference to FIG. 9 (*c*).

A figure 1120 may be drawn on a bottom mirroring region using a pointer 1101 of the bottom mirroring region, while such a figure may not disappear on a top mirroring region. Moreover, a highlight 1130 drawn by a pointer 1105 of a user of the top mirroring region may not be displayed on the bottom mirroring region.

While the independent type control authority is granted, 'read/write/revise' may be independently performed on the same content in each of the mirroring regions. And, an item changed according to the independent 'read/write/revise' may be mutually reflected or separately saved. This may be described with reference to FIG. 11D as follows.

Figure 11D:
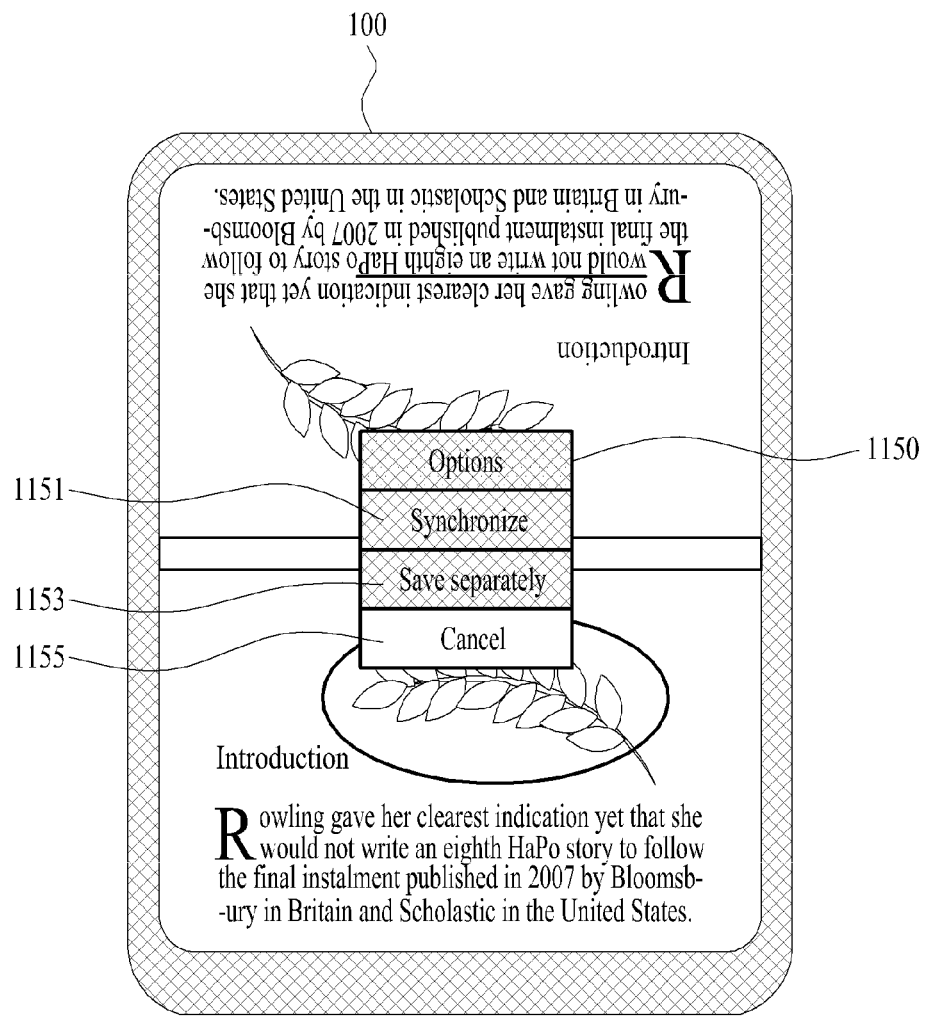

Referring to FIG. 11D, after an independent type control authority has been granted, if a type of the control authority is changed by one of the above-mentioned method or the mirroring function is cancelled, a popup window 1150 for handling a changed item may be displayed.

In doing so, if a menu 'synchronize' 1151 is selected, the changed item performed in each mirroring region may be reflected by both of the mirroring regions like the coherence dependent type control authority. If a menu 'save separately' 152 is selected, each changed item generated from each of the mirroring regions may be saved as a separate file in the memory unit 160. In doing so, a saving format may include an add-on file format capable of creating a changed item reflecting content in combining the changed item with an original content only or a content file itself that reflects the changed item. If a menu 'cancel' 115 is selected, the change of the control authority or the cancellation of the mirroring function may be cancelled.

Scope Setting of Control Authority

The control authorities mentioned in the above description relate to inclusive concept of performing all kinds of function. Yet, according to another example of the present embodiment, an executable authority may be individually set. This may be described with reference to FIG. 12 as follows.

Figure 12:
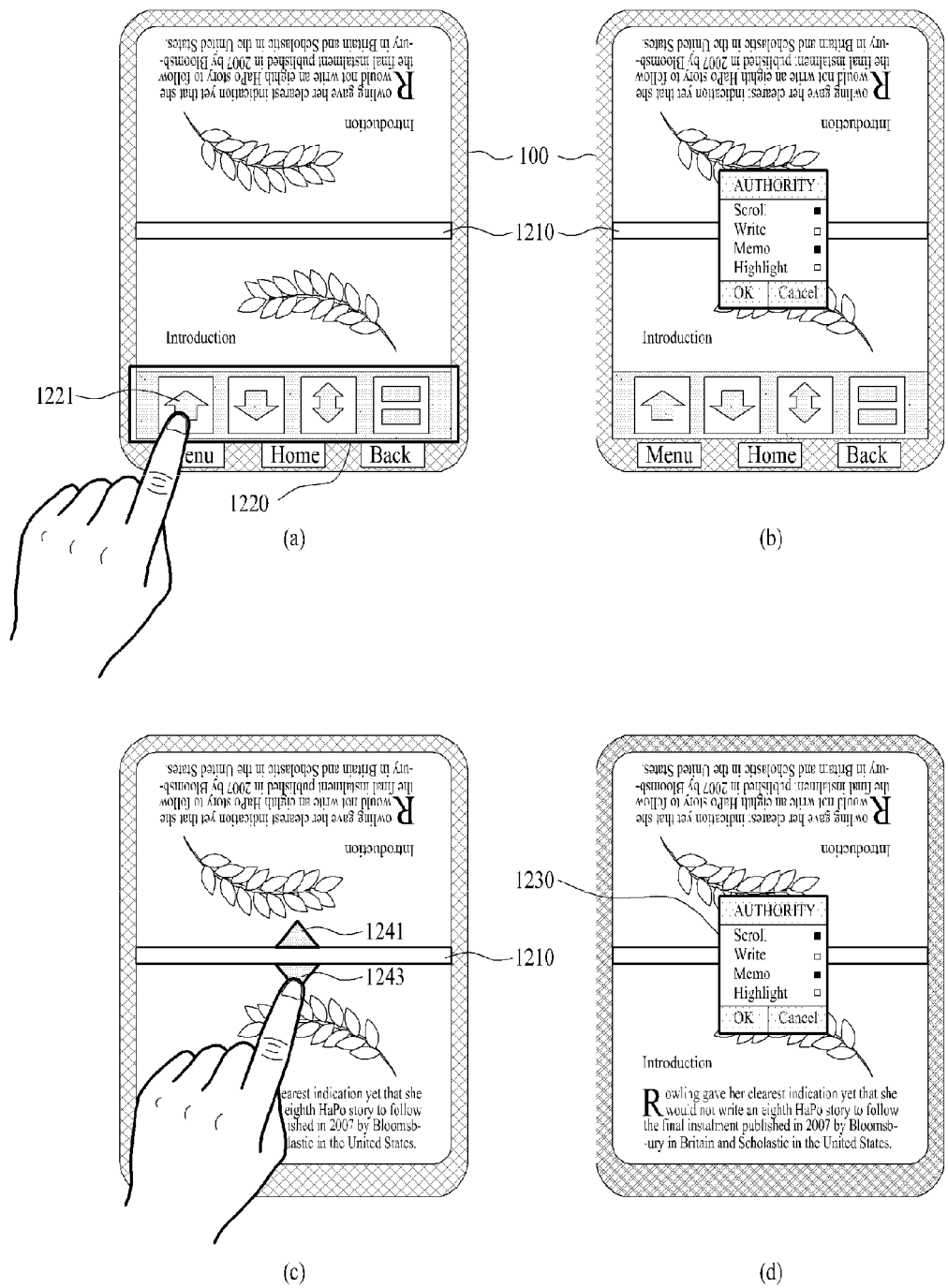
FIG. 12 is a diagram for one example of a type for setting a scope of the control authority according to different implementation of one embodiment of the present invention.

FIG. 12 is a diagram for one example of a type for setting a scope of the control authority according to different implementation of one embodiment of the present invention.

In FIG. 12 (a), assume a case similar to that shown in FIG. 9 (c).

Referring to FIG. 12 (a), in order to grant a control authority to a top mirroring region above a mirroring bar 1210, a far left icon 1221 may be selected from control authority grant icons 1220. Subsequently, if a touch input (e.g., a long touch) of a type different from that of a touch for a simple selection is applied to the far left icon 1221, a popup window 1230 for an authority selection may be displayed as shown in FIG. 12 (b). Using the popup window 1230, it may be able to determine whether a prescribed subordinate authority is included in the control authority. FIG. 12 (b) shows a status that a scroll authority and a memo write authority are selected. After the selection of the subordinate authority to grant is completed, a user may be able to grant the control authority including the selected subordinate authority to the top mirroring region by selecting a button 'OK' provided to a bottom side of the popup window 1230.

In doing so, the types of the subordinate authorities included in the popup window may vary in accordance with an application.

In FIG. 12 (c), assume a case similar to that shown in FIG. 9 (c).

Referring to FIG. 12 (c), in order to grant a control authority to a bottom mirroring region below a mirroring bar 1210, a bottom icon 1243 may be selected from control authority grant icons 1241 and 1243. In case that a touch input (e.g., a long touch) of a type different from that of a touch for a simple selection is applied to the bottom icon 1243, a popup window 1230 for an authority selection may be displayed as shown in FIG. 12 (d). Since a function of the popup window 1230 shown in FIG. 12 (d) is similar to that shown in FIG. 12 (b), its redundant description shall be omitted for clarity.

The present method may be applicable when a control authority is initially granted. Alternatively, the present method may be applicable for the purpose of amending a subordinate authority of the already-granted control authority.

Details of Application Example

In the following description, an example of applying a mirroring function may be described in detail with reference to FIG. 13 based on the above description.

Figure 13:
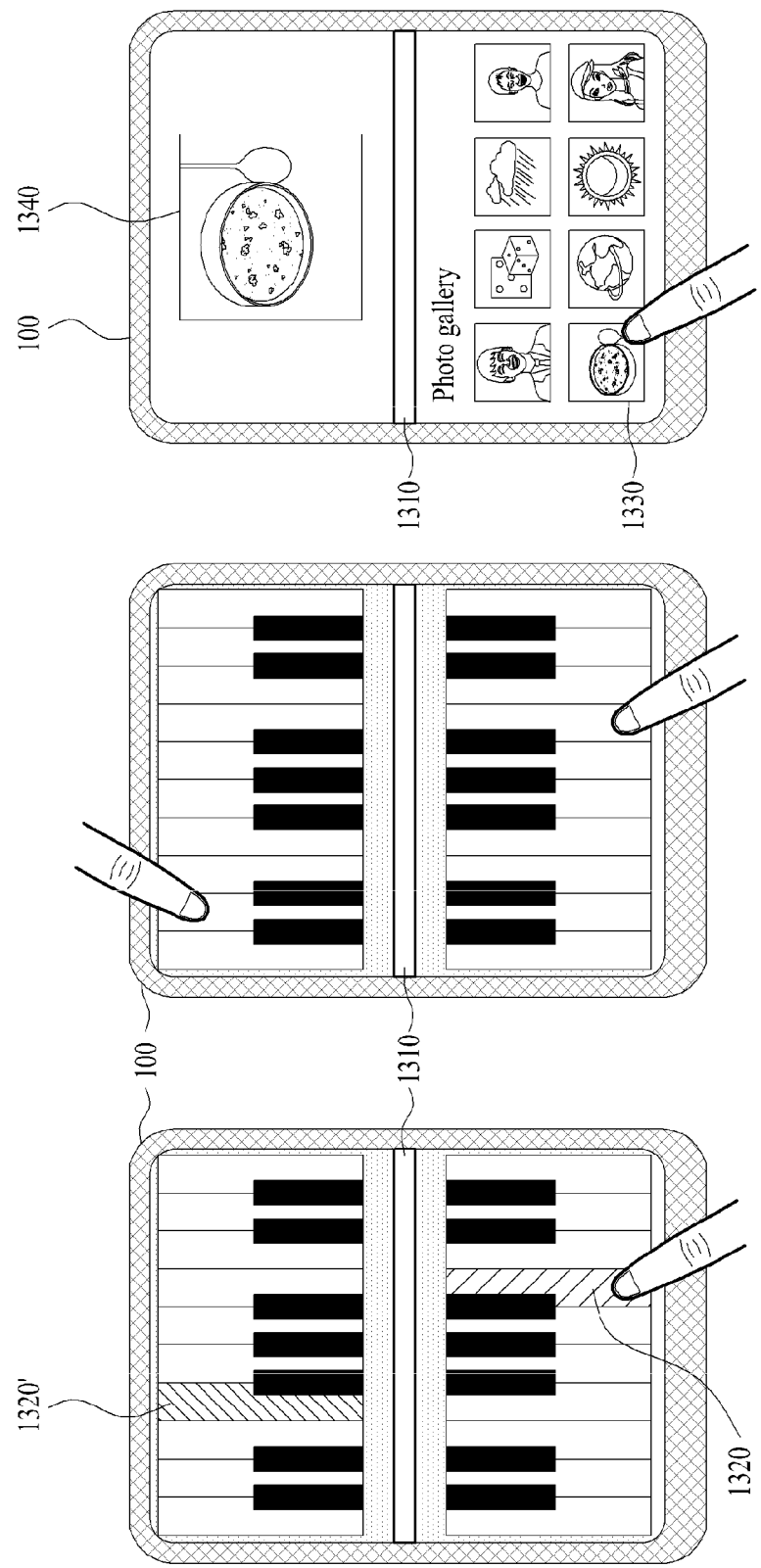
FIG. 13 is a diagram for one example of various types for performing a mirroring function according to one embodiment of the present invention.

FIG. 13 is a diagram for one example of various types for performing a mirroring function according to one embodiment of the present invention.

Referring to FIG. 13 (a), a plano application is being activated via a mirroring function. In doing so, assume a case that a bottom region below a mirroring bar 1310 is set as a master region. And, assume a case that a top region above the mirroring bar 1310 is set as a slave region. Moreover, assume that such a prescribed visual effect as a highlight is given to a specific key in case of applying a touch input to the specific key of a keyboard. On the assumptions, when a specific key 1320 in the master region is hit, a visual effect is given to a corresponding key 1320' in the slave region in accordance with a mirroring function.

In case that a coherence dependent type control authority is set for a plano application, referring to FIG. 13 (b), each user is able to touch keys of a same scale in each mirroring region. On the other hand, in case that a independent type control authority is set, keys of different scales may be displayed on the mirroring regions, respectively.

According to another example of the present embodiment, an asymmetric mirroring function may be executed. In this case, the asymmetric mirroring function means a case that a format of a displayed content is different despite that mirroring regions are rotated against each other at 180 degrees. For instance, referring to FIG. 13 (c), assume a case that a gallery application is activated via a mirroring function. Assume a case that a bottom region below a mirroring bar 1310 is set as a master region. And, assume a case that a top region above the mirroring bar 1310 is set as a slave region. Thumbnails of picture files are displayed on the master region, while a picture file 1340 corresponding to a thumbnail 1330 selected from the master region may be displayed on the slave region in a total region size.

The above-mentioned embodiments are described with reference to the terminology 'mirroring' that means 180-degree rotation, by which the present invention may be non-limited. Alternatively, the present invention may be applicable to side-to-side symmetry, top-to-bottom symmetry or simple partition without rotation or symmetry.

The above-mentioned embodiments are described with reference to the method of partitioning the display unit into a top region and a bottom region, by which the present invention may be non-limited. Alternatively, a mirroring bar may be set in a horizontal or diagonal direction.

According to one embodiment of the present invention, the above-described methods may be implemented in a program recorded medium as processor-readable codes. The processor-readable media may include ROM, RAM, CD-ROM, magnetic tapes, floppy discs, optical data storage devices, and the like for example and also include carrier-wave type implementations (e.g., transmission via Internet).

The aforementioned embodiments are achieved by combination of structural elements and features of the present invention in a predetermined type. Each of the structural elements or features should be considered selectively unless specified separately. Each of the structural elements or features may be carried out without being combined with other structural elements or features. Also, some structural elements and/or features may be combined with one another to constitute the embodiments of the present invention.

It will be apparent to those skilled in the art that various modifications and variations can be made in the present invention without departing from the scope of the inventions. Thus, it is intended that the present invention covers the modifications and variations of this invention provided they come within the scope of the appended claims and their equivalents.

What is claimed is:

1. A mobile terminal comprising:
   a touchscreen configured to receive a touch input, and to display an execution screen of an application; and
   a controller configured to set a reference indicator on the touchscreen based on a first user input, partition the touchscreen into a $1^{st}$ region and a $2^{nd}$ region in accordance with the set reference indicator, and control an image displayed on the $1^{st}$ region to be displayed on the $2^{nd}$ region in a manner of being reversed,
   wherein the image displayed on the $1^{st}$ region corresponds to either a first partial image of the execution screen or a second partial image of the execution screen,
   wherein the first partial image and the second image are partitioned from the execution screen in accordance with the set reference indicator,
   wherein, when a second user input is inputted, the controller is further configured to:
      display an icon on the touchscreen; and
      recognize a touch input only in one of the $1^{st}$ and the $2^{nd}$ regions, at which the icon is situated, and
   wherein the icon is moved across a line partitioning the $1^{st}$ region and the $2^{nd}$ region.

2. The mobile terminal of claim 1, wherein the reversion includes at least one of a 180-degree rotation, side-to-side symmetry and top-to-bottom symmetry.

3. The mobile terminal of claim 1, wherein the reference indicator is realized as a reference line.

4. The mobile terminal of claim 3, wherein the first user input is a $1^{st}$ pattern touch input and comprises a touch & drag input inputted from a first predetermined position on the touchscreen to a second predetermined position, wherein the controller is adapted to set the reference indicator or reference line along a trace of the touch & drag input.

5. The mobile terminal of claim 4, wherein only if a contact size of touch & drag input is equal to or greater than a preset value, the controller is adapted to control the reference line to be set.

6. The mobile terminal of claim 4, wherein when the touch & drag input starts, the controller is adapted to provide a prescribed visual effect along the trace of the touch & drag input.

7. The mobile terminal of claim 1, wherein if a second user input is recognized, the controller is adapted to determine whether to recognize a touch input via the $1^{st}$ or $2^{nd}$ region.

8. The mobile terminal of claim 1, wherein the controller is adapted to display a $1^{st}$ icon associated to the $1^{st}$ region and a $2^{nd}$ icon associated to the $2^{nd}$ region on the touch screen and wherein the controller is adapted to control the touch input to be recognized via the region corresponding to either the $1^{st}$ icon or the $2^{nd}$ icon selected via the touch input only.

9. The mobile terminal of claim 8, wherein when both of the $1^{st}$ icon and the $2^{nd}$ icon are selected together and if an image displayed on a corresponding region is changed in accordance with the touch input via one of the two regions, the controller is adapted to control the changed image to be applied to both of the regions.

10. The mobile terminal of claim 8, wherein if the touch input of a $3^{rd}$ pattern is recognized by being applied to one of the two icons, the controller is adapted to display a popup window including a list of recognizable commands on the touchscreen and wherein if at least one recognizable command is selected from the popup window, the controller is adapted to recognize the selected command only via the region corresponding to the $3^{rd}$ pattern touch input recognized icon.

11. The mobile terminal of claim 1, wherein when an image displayed on the $1^{st}$ region is changed according to an user input, the controller is adapted to control an image displayed on the $2^{nd}$ region to be changed correspondingly.

12. The mobile terminal of claim 1, wherein when an image displayed on one of the region is changed in accordance with a user input, the controller is adapted to control the changed image to be applied to both of the regions of the touchscreen.

13. The mobile terminal of claim 1, further comprising an orientation sensor, wherein the controller is adapted to partition the touchscreen into a $1^{st}$ region and a $2^{nd}$ region only, if the orientation sensor provides a horizontal alignment signal.

14. A method of controlling a mobile terminal, the method comprising:
   recognizing a first user input;
   displaying an execution screen of an application on a touch screen;
   setting a reference indicator on the touchscreen based on the first user input;
   partitioning the touchscreen into a $1^{st}$ region and a $2^{nd}$ region in accordance with the set reference indicator; and
   controlling an image displayed on the $1^{st}$ region to be displayed on the $2^{nd}$ region in a manner of being reversed,
   wherein the image displayed on the $1^{st}$ region corresponds to either a first partial image of the execution screen or a second partial image of the execution screen,
   wherein the first partial image and the second image are partitioned from the execution screen in accordance with the set reference indicator,
   wherein, when a second user input is inputted, the method further comprises:
      displaying an icon on the touchscreen; and
      recognizing a touch input only in one of the $1^{st}$ and the $2^{nd}$ regions, at which the icon is situated, and
   wherein the icon is moved across a line partitioning the $1^{st}$ region and the $2^{nd}$ region.

* * * * *